United States Patent
LaBarre et al.

(10) Patent No.: US 10,755,356 B1
(45) Date of Patent: Aug. 25, 2020

(54) SYSTEM AND METHOD FOR PROVIDING CUSTOMERS WITH RATES FROM INSURANCE PROVIDERS FOR PURCHASING PASSENGER INSURANCE IN AN AUTONOMOUS VEHICLE

(71) Applicant: STATE FARM MUTUAL AUTOMOBILE INSURANCE COMPANY, Bloomington, IL (US)

(72) Inventors: Thomas Edward LaBarre, Prospect Heights, IL (US); Timothy Joel Davis, Warrenville, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 1104 days.

(21) Appl. No.: 15/010,864

(22) Filed: Jan. 29, 2016

Related U.S. Application Data

(60) Provisional application No. 62/204,078, filed on Aug. 12, 2015.

(51) Int. Cl.
*G06Q 40/08* (2012.01)

(52) U.S. Cl.
CPC .................... *G06Q 40/08* (2013.01)

(58) Field of Classification Search
CPC ...... G06Q 40/08; G06Q 10/10; G06Q 30/0283
USPC .......................................................... 705/4
See application file for complete search history.

(56) References Cited

U.S. PATENT DOCUMENTS

| 8,595,037 B1* | 11/2013 | Hyde | G06Q 40/08 701/2 |
| 9,454,786 B1* | 9/2016 | Srey | G06Q 40/08 |
| 2014/0257867 A1* | 9/2014 | Gay | G07C 5/00 705/4 |
| 2015/0242953 A1 | 8/2015 | Suiter | |
| 2016/0189304 A1* | 6/2016 | Todasco | G06Q 40/08 705/4 |

OTHER PUBLICATIONS

U.S. Appl. No. 14/713,137, filed May 15, 2015.
U.S. Appl. No. 14/713,184, filed May 15, 2015.
U.S. Appl. No. 14/713,188, filed May 15, 2015.
U.S. Appl. No. 14/713,194, filed May 15, 2015.
(Continued)

*Primary Examiner* — Bennett M Sigmond
*Assistant Examiner* — Michael D Cranford
(74) *Attorney, Agent, or Firm* — Marshall, Gerstein & Borun LLP

(57) ABSTRACT

A method and system may provide customers with rates from multiple insurance providers for purchasing trip-based passenger insurance in autonomous vehicles. A server device may receive vehicle identification information for an autonomous vehicle that is providing transportation services for a user on a vehicle trip. Based on the vehicle identification information, the server device may obtain trip-based passenger insurance premiums from multiple insurance providers and transmit the trip-based passenger insurance premiums and indications of the corresponding insurance providers to the user. When the user selects one of the trip-based passenger insurance premiums, the server device may provide a passenger insurance policy for the vehicle trip to the user.

15 Claims, 12 Drawing Sheets

(56) References Cited

OTHER PUBLICATIONS

U.S. Appl. No. 14/713,201, filed May 15, 2015.
U.S. Appl. No. 14/713,206, filed May 15, 2015.
U.S. Appl. No. 14/713,214, filed May 15, 2015.
U.S. Appl. No. 14/713,217, filed May 15, 2015.
U.S. Appl. No. 14/713,223, filed May 15, 2015.
U.S. Appl. No. 14/713,226, filed May 15, 2015.
U.S. Appl. No. 14/713,230, filed May 15, 2015.
U.S. Appl. No. 14/713,237, filed May 15, 2015.
U.S. Appl. No. 14/713,240, filed May 15, 2015.
U.S. Appl. No. 15/010,843, filed Jan. 29, 2016.
Office Action for U.S. Appl. No. 15/010,843, dated Sep. 3, 2019.
Office Action for U.S. Appl. No. 15/010,843, dated Jan. 11, 2019.

* cited by examiner

⬐ 440

```
┌─────────────────────────────┐
│ ▫▫▫▫ CARRIER 3G      4:20PM │
│    Enter Payment Information│
│                             │
│  Cardholder First Name: [ ] │
│                             │
│  Cardholder Last Name:  [ ] │
│                             │
│  Credit Card Number:    [ ] │
│                             │
│  Expiration Date:       [ ] │
│                             │
│  Security Code (CSC):   [ ] │
│                             │
│                             │
│            [ Submit ]       │
└─────────────────────────────┘
```

442 — Cardholder First Name:
444 — Cardholder Last Name:
446 — Credit Card Number:
448 — Expiration Date:
450 — Security Code (CSC):
454 — Submit

| | |
|---|---|
| ▫▫▫▫▫ CARRIER 3G | 4:20PM |

Receipt

| | | |
|---|---|---|
| Trip Distance: | 10.3 miles | — 478 |
| Trip Time: | 00:45:30 | — 480 |
| Cost Per Minute: | $0.15 | — 482 |
| Cost Per Mile: | 0 | — 484 |
| Subtotal: | $6.82 | — 486 |
| Credit Card: | xxxxxx-1234 | — 488 |
| Billed to Card: | $6.82 | — 490 |

FIG. 4E

SYSTEM AND METHOD FOR PROVIDING CUSTOMERS WITH RATES FROM INSURANCE PROVIDERS FOR PURCHASING PASSENGER INSURANCE IN AN AUTONOMOUS VEHICLE

CROSS-REFERENCE TO RELATED APPLICATIONS

This application claims priority to and the benefit of the filing date of U.S. Provisional Patent Application No. 62/204,078 entitled "SYSTEM AND METHOD FOR PROVIDING CUSTOMERS WITH RATES FROM INSURANCE PROVIDERS FOR PURCHASING PASSENGER INSURANCE IN AN AUTONOMOUS VEHICLE," filed on Aug. 12, 2015, the entire contents of which is hereby expressly incorporated by reference. This application is also related to co-pending U.S. patent application Ser. No. 15/010,843 entitled "METHOD AND SYSTEM FOR PROVIDING TRIP-BASED PASSENGER INSURANCE IN AUTONOMOUS VEHICLES" and filed concurrently herewith, the entire disclosure of which is hereby expressly incorporated by reference.

TECHNICAL FIELD

The present disclosure generally relates to systems and methods for offering vehicle insurance policies and, more particularly to vehicle insurance policies where vehicle operation is fully automated and where insurance coverage is measured by the trip usage of the vehicle.

BACKGROUND

Vehicle or automobile insurance exists to provide financial protection against physical damage and/or bodily injury resulting from traffic accidents and against liability that could arise therefrom. Typically, a customer purchases a vehicle insurance policy for a policy rate having a specified term. In exchange for payments from the insured customer, the insurer pays for damages to the insured which are caused by covered perils, acts, or events as specified by the language of the insurance policy. The payments from the insured are generally referred to as "premiums," and typically are paid on behalf of the insured over time at periodic intervals. An insurance policy may remain (or have a status or state of) "in-force" while premium payments are made during the term or length of coverage of the policy as indicated in the policy. An insurance policy may "lapse" (or have a status or state of "lapsed"), for example, when premium payments are not being paid or if the insured or the insurer cancels the policy.

Premiums may be typically determined based upon a selected level of insurance coverage, location of vehicle operation, vehicle model, and characteristics or demographics of the vehicle operator. The characteristics of a vehicle operator that affect premiums may include age, years operating vehicles of the same class, prior incidents involving vehicle operation, and losses reported by the vehicle operator to the insurer or a previous insurer. Past and current premium determination methods do not, however, account for use of autonomous vehicle operating features. The present embodiments may, inter alia, alleviate this and/or other drawbacks associated with conventional techniques.

Moreover, conventional vehicle insurance policies are typically based on an insurance "term," which specifies a fixed time period during which the coverage is in-force (usually six months), regardless of usage during the time period. Some policies may be based at least in part on an estimated distance that the vehicle may travel during the term, but distance traveled is highly variable over time. Therefore, conventional vehicle insurance policies that are priced according to a specified term may not accurately reflect the actual mileage or time that a vehicle is driven, metrics that are difficult to estimate, determine, and/or verify.

SUMMARY

A system may provide customers with rates from multiple insurance providers for purchasing trip-based passenger insurance in autonomous vehicles. The system may include a computing device which receives vehicle identification information for an autonomous vehicle providing transportation services for a user on a vehicle trip. The computing device may determine characteristics of the autonomous vehicle based on the vehicle identification information (e.g., autonomous operation features within the vehicle, the age of the vehicle, a location associated with the vehicle such as a garaging location, components within the vehicle such as the type of transmission, the engine type, etc.). The computing device may then search for insurance providers who offer trip-based passenger insurance for autonomous vehicles, and may identify the insurance premiums, based on a vehicle usage unit, that each insurance provider offers for passenger insurance in autonomous vehicles having similar vehicle characteristics. The insurance premiums may then be displayed to the user with indications of their respective insurance providers, and when the user selects one of the insurance premiums, the user may be directed to purchase the insurance policy corresponding to the selected insurance premium through the corresponding insurance provider.

For example, the computing device may determine that for vehicles having similar vehicle characteristics as a 2011 Vehicle XB7, Insurance Company A offers a trip-based passenger insurance policy for an insurance premium of $0.70 a mile, Insurance Company B offers a trip-based passenger insurance policy for an insurance premium of $0.75 a mile, and Insurance Company C offers a trip-based passenger insurance policy for an insurance premium of $0.80 a mile. Moreover, Insurance Company A offers a trip-based passenger insurance policy for an insurance premium of $0.25 a minute, Insurance Company B offers a trip-based passenger insurance policy for an insurance premium of $0.30 a minute, and Insurance Company C offers a trip-based passenger insurance policy for an insurance premium of $0.35 a minute. Each of these insurance premiums and their corresponding insurance providers may be displayed on the user's mobile device and the user may select one of the insurance premiums for passenger insurance covering the vehicle trip.

If the user selects one of the insurance premiums, the computing device or the insurance provider may transmit an insurance policy to the user providing passenger insurance coverage for the vehicle trip and/or a confirmation that the passenger has passenger insurance coverage for the vehicle trip. Such coverage may include personal injury coverage, death and dismemberment coverage, trip protection coverage (e.g., providing protection for delays which may lead to the passenger missing a scheduled flight, etc.), or any other type of coverage providing protection against potential loss to the passenger.

In some embodiments, the computing device may also receive sensor data from the autonomous vehicle indicative of a departure location and/or time of the vehicle trip, a destination location and/or time of the vehicle trip, a distance traveled during the vehicle trip, etc. Based on the sensor data and the selected insurance premium, the computing device may determine a total cost of passenger insurance for the vehicle trip which may be charged to the user in exchange for the provided coverage.

In this manner, passengers who do not own autonomous vehicles may purchase insurance for individual vehicle trips. Moreover, passengers who have safety concerns with autonomous vehicles may insure themselves against any potential injury which may occur during the course of a vehicle trip. Additionally, passengers may arrange for individual trips in autonomous vehicles at the last minute, and may not decide whether or not they want insurance for the vehicle trip ahead of time. The present embodiments advantageously allow such passengers to quickly and efficiently purchase passenger insurance for individual trips when entering the autonomous vehicles.

For example, the user may request a ride from her home to her place of business by an autonomous vehicle. Using her mobile device, the user may transmit, for example, the vehicle identification number (VIN) of the autonomous vehicle, a scanned image of the license plate number for the autonomous vehicle, a scanned barcode disposed within the autonomous vehicle and including vehicle identification information, vehicle identification information received from an on-board computer within the vehicle, etc. The computing device may determine characteristics of the vehicle based on the vehicle identification information such as autonomous operation features of the vehicle. These characteristics may be compared to characteristics for other vehicles. The computing device may then obtain insurance premiums for the passenger insurance from several insurance providers based on the characteristics of the autonomous vehicle.

In an embodiment, a computer-implemented method for providing customers with rates from insurance providers for trip-based passenger insurance in a vehicle having one or more autonomous operation features for controlling the vehicle is provided. The method includes receiving vehicle identification information for a vehicle having one or more autonomous operation features for controlling the vehicle, wherein the vehicle provides transportation services for a user on a vehicle trip, determining one or more characteristics of the vehicle based on the vehicle identification information, and identifying a plurality of insurance providers that provide trip-based passenger insurance in vehicles having one or more autonomous operation features for controlling the vehicles. For each of the identified insurance providers, the method includes determining one or more passenger insurance premiums for insuring the user during the vehicle trip based on the one or more characteristics of the vehicle, wherein each of the one or more passenger insurance premiums includes a cost per vehicle usage unit, causing indications of each of the identified plurality of insurance providers and the corresponding one or more passenger insurance premiums to be displayed to the user, and causing a plurality of user controls to be displayed to the user corresponding to each of the identified plurality of insurance providers, wherein each user control directs the user to a page for purchasing a selected passenger insurance premium from the corresponding insurance provider.

In another embodiment, a system for providing customers with rates from insurance providers for trip-based passenger insurance in a vehicle having one or more autonomous operation features for controlling the vehicle is provided. The system includes a communication network, one or more processors communicatively coupled to the communication network, and a non-transitory computer-readable memory coupled to the one or more processors and storing instructions thereon. When executed by the one or more processors, the instructions cause the system to receive, via the communication network, vehicle identification information for a vehicle having one or more autonomous operation features for controlling the vehicle, wherein the vehicle provides transportation services for a user on a vehicle trip, determine one or more characteristics of the vehicle based on the vehicle identification information, and identify a plurality of insurance providers that provide trip-based passenger insurance in vehicles having one or more autonomous operation features for controlling the vehicles. For each of the identified plurality of insurance providers, the instructions cause the system to determine one or more passenger insurance premiums for insuring the user during the vehicle trip based on the one or more characteristics of the vehicle, wherein each of the one or more passenger insurance premiums includes a cost per vehicle usage unit, cause indications of each of the identified plurality of insurance providers and the corresponding one or more passenger insurance premiums to be displayed to the user, and cause a plurality of user controls to be displayed to the user corresponding to each of the identified plurality of insurance providers, wherein each user control directs the user to a page for purchasing a selected passenger insurance premium from the corresponding insurance provider.

In yet another embodiment, a portable computing device removably attached to a vehicle having one or more autonomous operation features for controlling the vehicle is provided. The portable computing device includes a user interface, a communication network, one or more processors communicatively coupled to the communication network and the user interface, and a non-transitory computer-readable memory coupled to the one or more processors and storing instructions thereon. When executed by the one or more processors, the instructions cause the portable device to obtain vehicle identification information for a vehicle having the portable computing device removably attached, wherein the vehicle includes one or more autonomous operation features for controlling the vehicle and the vehicle provides transportation services for a user on a vehicle trip, display, on the user interface, for each of a plurality of insurance providers, indications of each insurance provider and one or more corresponding passenger insurance premiums for insuring the user during the vehicle trip, wherein each of the one or more passenger premiums includes a cost per vehicle usage unit, and display, on the user interface, a plurality of user controls corresponding to each of the plurality of insurance providers, wherein each user control directs the user to a page for purchasing a selected passenger insurance premium from the corresponding insurance provider. The instructions further cause the portable device to receive, via one or more user controls on the user interface, a selection by the user of at least one of the one or more passenger insurance premiums, obtain payment information for the selected at least one passenger insurance premium, and display, on the user interface, an insurance policy for the user based on the selected at least one passenger insurance premium.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 4C illustrates an exemplary payment information screen of a client application in accordance with the presently described embodiments;

FIG. 4E illustrates an exemplary passenger insurance receipt screen of a client application in accordance with the presently described embodiments;

DETAILED DESCRIPTION

Figure 1:
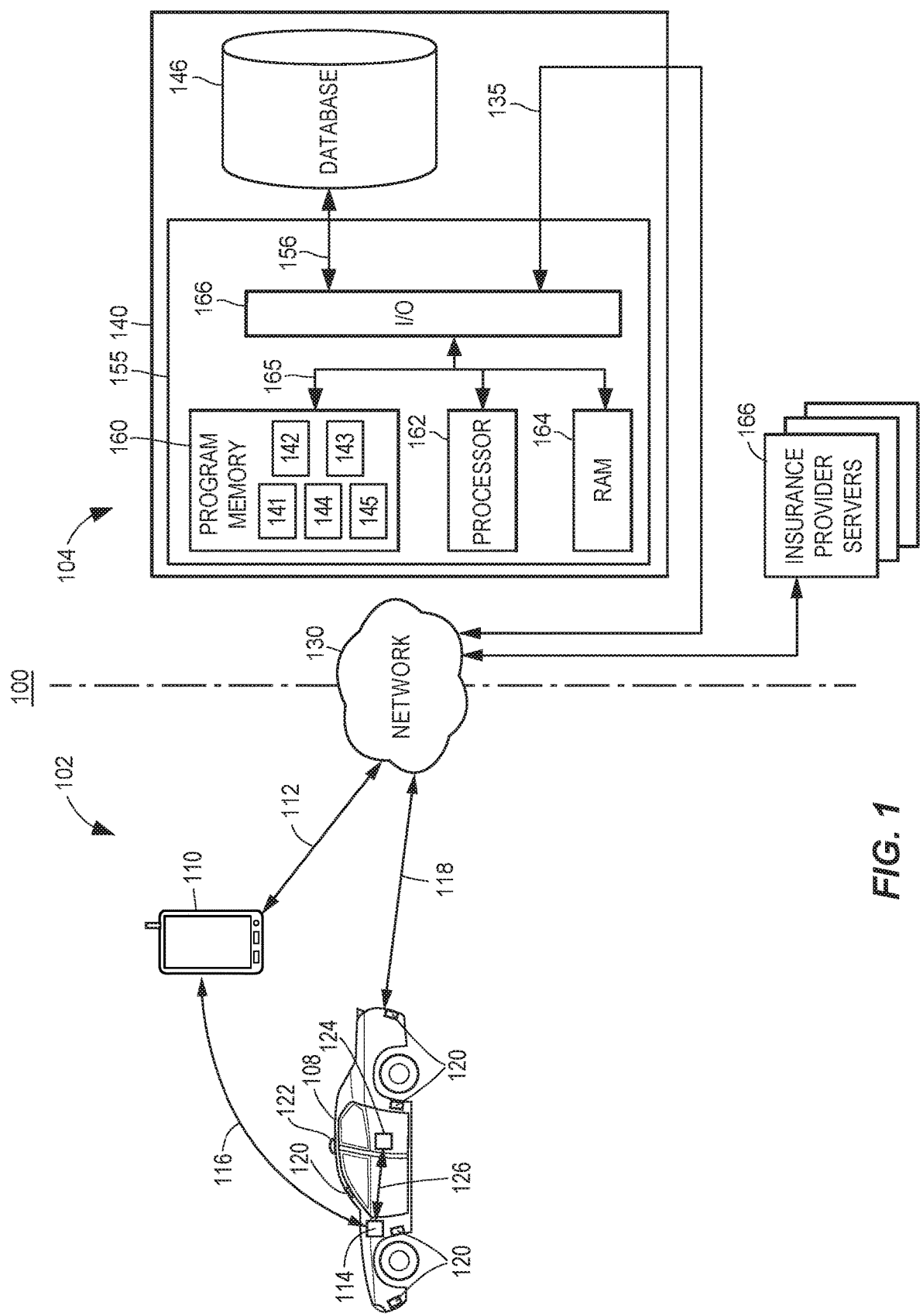
FIG. 1 illustrates a block diagram of an exemplary computer network, a computer server, a mobile device, an on-board computer, and a mobile payment device for implementing autonomous vehicle operation, and passenger insurance processes in accordance with the described embodiments.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Accordingly, as used herein, the term "vehicle" may refer to any of a number of motorized transportation devices. A vehicle may be a car, truck, bus, train, boat, plane, motorcycle, snowmobile, other personal transport devices, etc. Also as used herein, an "autonomous operation feature" of a vehicle means a hardware or software component or system operating within the vehicle to control an aspect of vehicle operation without direct input from a vehicle operator once the autonomous operation feature is enabled or engaged. The term "autonomous vehicle" means a vehicle including at least one autonomous operation feature capable of operating the vehicle in the absence of or without operating input from a vehicle operator.

As used herein, a "vehicle trip" means one use of a vehicle to travel from a departure location to a destination location. The departure and destination locations may be the same location, such as where a vehicle picks up a passenger at the departure location, travels to a third point and then travels back to the departure location. The departure and destination locations may alternatively be different locations, such as when a vehicle picks up a passenger at a departure location and drops the passenger off at a destination location. A vehicle trip may include one or more stops along the route of the vehicle between the departure location and the destination location. Also as used herein, a "stop" means any point along the route of the vehicle during a vehicle trip where the vehicle trip is interrupted for a period of time, during which the vehicle's progress between the departure location and the destination location is halted, other than by the ordinary and momentary cessation of movement of the vehicle in the usual course of operation or as required by control signals, by law, or to avoid collisions. For example, a car may pause at a traffic light, stop sign, toll booth, or along a road to yield way to an emergency vehicle without such pause being a "stop" as used herein. In various embodiments, stops of a vehicle may be measured in a number of ways, including time, engine shut-down, or location (e.g., exiting a road or entering a dock).

Additionally, the term "insurance policy," as used herein, generally refers to a contract between an insurer and an insured. In exchange for payments from the insured, the insurer pays for damages to the insured which are caused by covered perils, acts or events as specified by the language of the insurance policy. The payments from the insured are generally referred to as "premiums," and typically are paid on behalf of the insured upon purchase of the insurance policy or over time at periodic intervals. The amount of the damages payment is generally referred to as a "coverage amount" or a "face amount" of the insurance policy. An insurance policy may remain (or have a status or state of)

"in-force" while premium payments are made during the term or length of coverage of the policy as indicated in the policy. An insurance policy may "lapse" (or have a status or state of "lapsed"), for example, when the parameters of the insurance policy have expired, when premium payments are not being paid, when a cash value of a policy falls below an amount specified in the policy, or if the insured or the insurer cancels the policy.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

Although the embodiments discussed herein relate to vehicle or automobile insurance policies, it should be appreciated that an insurance provider may offer or provide one or more different types of insurance policies. Other types of insurance policies may include, for example, homeowners insurance; condominium owner insurance; renter's insurance; life insurance (e.g., whole-life, universal, variable, term); health insurance; disability insurance; long-term care insurance; annuities; business insurance (e.g., property, liability, commercial auto, workers compensation, professional and specialty liability, inland marine and mobile property, surety and fidelity bonds); boat insurance; insurance for catastrophic events such as flood, fire, volcano damage and the like; motorcycle insurance; farm and ranch insurance; personal article insurance; personal liability insurance; personal umbrella insurance; community organization insurance (e.g., for associations, religious organizations, cooperatives); and other types of insurance products. In embodiments as described herein, the insurance providers process claims related to insurance policies that cover one or more properties (e.g., homes, automobiles, personal articles), although processing other insurance policies is also envisioned.

The terms "insured," "insured party," "policyholder," "customer," and "passenger" are used interchangeably herein to refer to a person, party, or entity (e.g., a business or other organizational entity) that is covered by the insurance policy, e.g., whose insured article or entity (e.g., property, life, health, auto, home, business) is covered by the policy. Generally, the term "user" is used when referring to a person who is operating a client device and is not exclusive of the terms "customer," "passenger," "insured," "insured party," and "policy holder."

Typically, a person or customer (or an agent of the person or customer) of an insurance provider fills out an application for an insurance policy. In some cases, the data for an application may be automatically determined or already associated with a potential customer. The application may undergo underwriting to assess the eligibility of the party and/or desired insured article or entity to be covered by the insurance policy, and, in some cases, to determine any specific terms or conditions that are to be associated with the insurance policy, e.g., amount of the premium, riders or exclusions, waivers, and the like. Upon approval by underwriting, acceptance of the applicant to the terms or conditions, and payment of the initial premium, the insurance policy may be in-force, (i.e., the policyholder is enrolled).

The present embodiments may relate to providing passenger insurance based upon autonomous functionality of a vehicle, and not the human driver. A smart vehicle may maneuver itself without human intervention and/or include sensors, processors, computer instructions, and/or other components that may perform or direct certain actions conventionally performed by a human driver.

The types of autonomous vehicle-related functionality or technology that may be used with the present embodiments to replace human driver actions may include and/or be related to the following types of functionality: (a) autonomous (driverless); (b) vehicle-to-vehicle (V2V) wireless communication; (c) vehicle-to-infrastructure (and/or vice versa) wireless communication; (d) automatic steering; (e) automatic acceleration; (f) automatic braking; (g) automatic blind spot monitoring; (h) automatic collision warning; (i) adaptive cruise control; (j) automatic parking/parking assistance; (k) automatic collision preparation (windows roll up, seat adjusts upright, brakes pre-charge, etc.); (l) pedestrian detection; (m) autonomous autonomous backup systems; (n) road mapping systems; (o) software security and anti-hacking measures; (p) theft prevention/automatic return; (q) automatic driving without occupants; and/or other functionality.

The adjustments to automobile insurance rates or premiums based upon the autonomous or semi-autonomous vehicle-related functionality or technology may take into account the impact of such functionality or technology on the likelihood of a vehicle accident or collision occurring. For instance, a processor may analyze historical accident information and/or test data involving vehicles having autonomous or semi-autonomous functionality. Factors that may be analyzed and/or accounted for that are related to insurance risk, accident information, or test data may include (1) point of impact; (2) type of road; (3) time of day; (4) weather conditions; (5) road construction; (6) type/length of trip; (7) vehicle style; (8) level of pedestrian traffic; (9) level of vehicle congestion; (10) atypical situations (such as manual traffic signaling); (11) availability of internet connection for the vehicle; and/or other factors. These types of factors may also be weighted according to historical accident information, predicted accidents, vehicle trends, test data, and/or other considerations.

Generally speaking, techniques for providing customers with rates from multiple insurance providers for purchasing trip-based passenger insurance in autonomous vehicles may be implemented in a network server, insurance provider servers, a mobile device, an autonomous vehicle, an onboard computer disposed within an autonomous vehicle, a mobile payment device disposed within an autonomous vehicle, or a system that includes a combination of these devices.

However, for exemplary purposes, the examples below focus primarily on an embodiment in which a user's mobile device transmits vehicle identification information to a server, which in turn, retrieves passenger insurance premiums from several insurance providers and transmits the passenger insurance premiums as well as indications of their respective insurance providers to the mobile device. The mobile device may transmit a selection of one of the passenger insurance premiums as well as payment information to the server, which in turn, may transmit the payment information to the corresponding insurance provider of the selected insurance premium. Moreover, the on-board computer may transmit vehicle trip information such as the estimated duration and distance of the vehicle trip to the server, and the server may transmit the vehicle trip information to the corresponding insurance provider for determining a cost of passenger insurance for the vehicle trip based on the selected insurance premium and the vehicle trip information. The insurance provider server may charge the cost of the passenger insurance to the user based on the payment information.

In other embodiments, the mobile payment device may receive the payment information, insurance premium selection, and vehicle trip information to charge the user for the passenger insurance. The mobile payment device may then transmit the amount charged to the user to the corresponding insurance provider.

FIG. 1 illustrates a block diagram of an exemplary autonomous vehicle passenger insurance system 100 on which the exemplary methods described herein may be implemented. The high-level architecture includes both hardware and software applications, as well as various data communications channels for communicating data between the various hardware and software components. The autonomous vehicle passenger insurance system 100 may be roughly divided into front-end components 102 and back-end components 104. The front-end components 102 may obtain information regarding a vehicle 108 (e.g., a car, truck, motorcycle, etc.) and the surrounding environment. An on-board computer 114 may utilize this information to operate the vehicle 108 according to an autonomous operation feature. To monitor the vehicle 108, the front-end components 102 may include one or more sensors 120 installed within the vehicle 108 that may communicate with the on-board computer 114. The front-end components 102 may further process the sensor data using the on-board computer 114 or a client computing device such as a desktop computer or a mobile device 110 (e.g., a smart phone, a tablet computer, a laptop computer, a wearable computing device, a special purpose computing device, etc.) to determine when the vehicle is in operation and information regarding the vehicle. In some embodiments of the system 100, the front-end components 102 may communicate with the back-end components 104 via a network 130. Either the on-board computer 114 or the mobile device 110 may communicate with the back-end components 104 via the network 130 to allow the back-end components 104 to record information regarding vehicle usage. The back-end components 104 may use one or more servers 140 to receive data from the front-end components 102, obtain premiums from insurance providers, and/or facilitate purchase or renewal of an autonomous vehicle passenger insurance policy.

The front-end components 102 may be disposed within or communicatively connected to one or more on-board computers 114 and/or a mobile payment device 124, which may be permanently or removably installed in the vehicle 108. The on-board computer 114 may interface with the one or more sensors 120 within the vehicle 108 (e.g., an ignition sensor, an odometer, a system clock, a speedometer, a tachometer, an accelerometer, a gyroscope, a compass, a geolocation unit, a camera, a distance sensor, a collision sensor, etc.), which sensors may also be incorporated within or connected to the on-board computer 114. The on-board computer 114 may also interface with the mobile payment device 124, which may receive vehicle trip information from the on-board computer 114, display the cost associated with passenger insurance for the vehicle trip and/or the cost of the vehicle trip, and receive payment information for the vehicle trip and/or for passenger insurance from a passenger. The front-end components 102 may further include a communication component 122 to transmit information to and receive information from external sources, including other vehicles, infrastructure, or the back-end components 104. In some embodiments, the mobile device 110 may supplement the functions performed by the on-board computer 114 described herein by, for example, sending or receiving information to and from the mobile server 140 via the network 130. In other embodiments, the on-board computer 114 may perform all of the functions of the mobile device 110 described herein, in which case no mobile device 110 may be present in the system 100. Any of the client computing device, the on-board computer 114, or the mobile payment device 124 may communicate with the network 130 over links 112 and 118, respectively. Additionally, the client computing device such as the mobile device 110 and on-board computer 114 may communicate with one another directly over link 116. Moreover, the on-board computer 114 and the mobile payment device 124 may communicate with one another directly over link 126.

The client computing device may be either a general-use personal computer such as a desktop computer or mobile device 110 such as a cellular phone, smart phone, tablet computer, or a dedicated vehicle use monitoring device. Although only one mobile device 110 is illustrated, it should be understood that a plurality of mobile devices 110 and/or a plurality of personal computers may be used in some embodiments. For example, a passenger may pre-purchase passenger insurance on a personal computer at her home before the vehicle trip, and may receive the passenger insurance policy and/or a confirmation of passenger insurance on her mobile device 110. The passenger may pre-purchase the passenger insurance using a credit card or an online payment account such as (PayPal™, Bitcoin™, Google Wallet™, Apple Pay™ etc.).

The client computing device may interact with the server 140 to receive web pages and/or server data and may display the web pages and/or server data via a client application and/or an Internet browser (described below). For example, the mobile device 110 may display a passenger insurance selection screen of the client application and/or of a web page to a user, may receive an input from the user, and may interact with the server 140 depending on the type of user-specified input. The one or more servers 140 may include a web server, an entity-specific server (e.g. an Apple® server, etc.), a server that is disposed in a retail and/or proprietary network, etc.

The on-board computer 114 may be a general-use on-board computer capable of performing many functions relating to vehicle operation or a dedicated computer for autonomous vehicle operation. Further, the on-board computer 114 may be installed by the manufacturer of the vehicle 108 or as an aftermarket modification or addition to the vehicle 108. The mobile payment device 124 may include a magnetic stripe reader and/or a computer chip reader and a payment processing computer capable of performing many functions relating to mobile payment transactions. In some embodiments or under certain conditions, the mobile device 110, the on-board computer 114, or the mobile payment device 124 may function as thin-client devices that outsource some or most of the processing to the server 140.

The sensors 120 may be removably or fixedly installed within the vehicle 108 and may be disposed in various arrangements to provide information to the autonomous operation features. Among the sensors 120 may be included one or more of a GPS unit, a radar unit, a LIDAR unit, an ultrasonic sensor, an infrared sensor, a camera, an accelerometer, a tachometer, or a speedometer. Some of the sensors 120 (e.g., radar, LIDAR, or camera units) may actively or passively scan the vehicle environment for obstacles (e.g., other vehicles, buildings, pedestrians, etc.), lane markings, or signs or signals. Other sensors 120 (e.g., GPS, accelerometer, or tachometer units) may provide data for determining the location or movement of the vehicle 108. Yet other sensors 120 (e.g., collisions sensors) may detect a collision, and/or may determine the impact of the collision, the time of the collision, the location of the collision, etc. Information generated or received by the sensors 120 may be communicated to the on-board computer 114 or the mobile device 110 for use in autonomous vehicle operation. Moreover, information generated or received by the collision sensor may be communicated to the server device for verifying/ validating whether the passenger had insurance coverage at the time of the collision.

In some embodiments, the communication component 122 may receive information from external sources, such as other vehicles or infrastructure. The communication component 122 may also send information regarding the vehicle 108 to external sources. To send and receive information, the communication component 122 may include a transmitter and a receiver designed to operate according to predetermined specifications, such as the dedicated short-range communication (DSRC) channel, wireless telephony, Wi-Fi, or other existing or later-developed communications protocols. The received information may supplement the data received from the sensors 120 to implement the autonomous operation features. For example, the communication component 122 may receive information that an autonomous vehicle ahead of the vehicle 108 is reducing speed, allowing the adjustments in the autonomous operation of the vehicle 108.

In addition to receiving information from the sensors 120, the on-board computer 114 may directly or indirectly control the operation of the vehicle 108 according to various autonomous operation features. The autonomous operation features may include software applications or modules implemented by the on-board computer 114 to control the steering, braking, or throttle of the vehicle 108. To facilitate such control, the on-board computer 114 may be communicatively connected to the controls or components of the vehicle 108 by various electrical or electromechanical control components (not shown). In embodiments involving autonomous vehicles, the vehicle 108 may be operable only through such control components (not shown). In other embodiments, the control components may be disposed within or supplement other vehicle operator control components (not shown), such as steering wheels, accelerator or brake pedals, or ignition switches.

In some embodiments, the front-end components 102 communicate with the back-end components 104 via the network 130. The network 130 may be a proprietary network, a secure public internet, a virtual private network or some other type of network, such as dedicated access lines, plain ordinary telephone lines, satellite links, cellular data networks, or a combinations of these. Where the network 130 comprises the Internet, data communications may take place over the network 130 via an Internet communication protocol.

The back-end components 104 include one or more servers 140 and several insurance provider servers 166. Each server 140 may include one or more computer processors adapted and configured to execute various software applications and components of the autonomous vehicle passenger insurance system 100, in addition to other software applications. The server 140 may further include a database 146, which may be adapted to store data related to the operation of the vehicle 108 and its autonomous operation features. Such data might include, for example, dates and times of vehicle use, an estimated duration of vehicle use, use and settings of autonomous operation features, speed of the vehicle 108, RPM or other tachometer readings of the vehicle 108, lateral and longitudinal acceleration of the vehicle 108, incidents or near collisions of the vehicle 108, communication between the autonomous operation features and external sources, environmental conditions of vehicle operation (e.g., weather, traffic, road condition, etc.), errors or failures of autonomous operation features, or other data relating to use of the vehicle 108 and the autonomous operation features, which may be uploaded to the server 140 via the network 130. The database 146 may also store data related to insurance premiums offered by several insurance providers for several different types of autonomous vehicles (e.g., $0.20 a mile, $0.70 a minute, $30 a trip, etc.).

When vehicle identification information for the vehicle 108 is received at the server 140, the server 140 may determine characteristics of the vehicle 108 based on the vehicle identification information. For example, vehicles having a particular make, model, and year may contain the same autonomous operation features. Therefore, the server 140 may be able to determine the autonomous operation features of the vehicle 108 based on the corresponding make, model, and year.

The server 140 may search for data provided by the insurance provider servers 166 to retrieve trip-based passenger insurance premiums for vehicles having similar characteristics as the vehicle 108. In some embodiments, the server 140 may store each retrieved trip-based passenger insurance premium, corresponding insurance provider, and the associated set of characteristics, for example in the database 146. When the server 140 determines characteristics for a vehicle, the characteristics may be compared to the stored characteristics in the database 146. When a match is found, for example, by finding autonomous vehicles having similar characteristics as the vehicle, the server 140 may retrieve the trip-based passenger insurance premiums and insurance providers which correspond to the set of characteristics from the database 146. In any event, the server 140 may display the trip-based passenger insurance premiums and corresponding insurance providers to the user, and offer multiple passenger insurance policies for the user to choose from.

Although the autonomous vehicle passenger insurance system 100 is shown to include one vehicle 108, one mobile device 110, one on-board computer 114, one mobile payment device 124, one server 140, and three insurance provider servers 166, it should be understood that different numbers of vehicles 108, client computing devices, on-board computers 114, mobile payment devices 124, servers 140, and/or insurance provider servers 166 may be utilized. For example, the system 100 may include a plurality of servers 140, tens of insurance provider servers 166 and hundreds of client computing devices including mobile devices 110, on-board computers 114, or mobile payment devices 124, all of which may be interconnected via the network 130. Furthermore, the database storage or processing performed by the one or more servers 140 may be distributed among a plurality of servers 140 in an arrangement known as "cloud computing." This configuration may provide various advantages, such as enabling near real-time uploads and downloads of information as well as periodic uploads and downloads of information. This may in turn support a thin-client embodiment of the mobile device 110, the on-board computer 114, or the mobile payment device 124 discussed herein.

The server 140 may have a controller 155 that is operatively connected to the database 146 via a link 156. It should be noted that, while not shown, additional databases may be linked to the controller 155 in a known manner. For example, separate databases may be used for autonomous operation feature information, vehicle passenger insurance policy information, insurance premiums offered by insurance providers, and vehicle use information. The controller 155 may include a program memory 160, a processor 162 (which may be called a microcontroller or a microprocessor), a random-access memory (RAM) 164, and an input/output (I/O) circuit 166, all of which may be interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, or optically readable memories, for example. The controller 155 may also be operatively connected to the network 130 via a link 135.

The server 140 may further include a number of software applications stored in a program memory 160. The various software applications on the server 140 may include an autonomous operation information monitoring application 141 for receiving information regarding the vehicle 108 and its autonomous operation features, a vehicle comparison application 142 for comparing autonomous operation features of the vehicle 108 to autonomous operation features of other autonomous vehicles to find similar vehicles for which passenger insurance premiums have been identified, an insurance premium display application 143 for transmitting insurance premiums offered by several insurance providers for covering a passenger in the vehicle 108, an autonomous vehicle passenger insurance policy purchase application 144 for facilitating purchase or renewal of a passenger insurance policy covering a passenger in an autonomous vehicle, and a payment processing application 145 for receiving and processing payment information from the passenger and forwarding the payment information or payment amount to the insurance provider selected by the user. The various software applications may be executed on the same computer processor or on different computer processors.

Similar to the server 140, each insurance provider server 166 may also include a controller that is operatively connected to a database via a link. It should be noted that additional databases may be linked to the controller in a known manner. For example, separate databases may be used for storing flat rate passenger insurance premiums for an entire vehicle trip, passenger insurance premiums based on the duration of the vehicle trip, passenger insurance premiums based on the distance of the vehicle trip, etc. The controller may include a program memory, a processor (which may be called a microcontroller or a microprocessor), a RAM, and an I/O circuit, all of which may be interconnected via an address/data bus. It should be appreciated that the controller may include multiple microprocessors. Similarly, the memory of the controller may include multiple RAMs and multiple program memories. Also, it should be appreciated that the I/O circuit may include a number of different types of I/O circuits. The RAM and program memories may be implemented as semiconductor memories, magnetically readable memories, or optically readable memories, for example. The controller may also be operatively connected to the network via a link.

Each insurance provider 166 may further include a number of software applications stored in a program memory. The various software applications on each insurance provider server 166 may include an insurance premium determination application for determining an insurance premium for covering a passenger in the vehicle 108 based on the vehicle characteristics, an autonomous vehicle passenger insurance policy purchase application for generating a passenger insurance policy corresponding to the selected insurance premium, and a payment processing application for receiving and processing payment information from the passenger. The various software applications may be executed on the same computer processor or on different computer processors.

Figure 2:
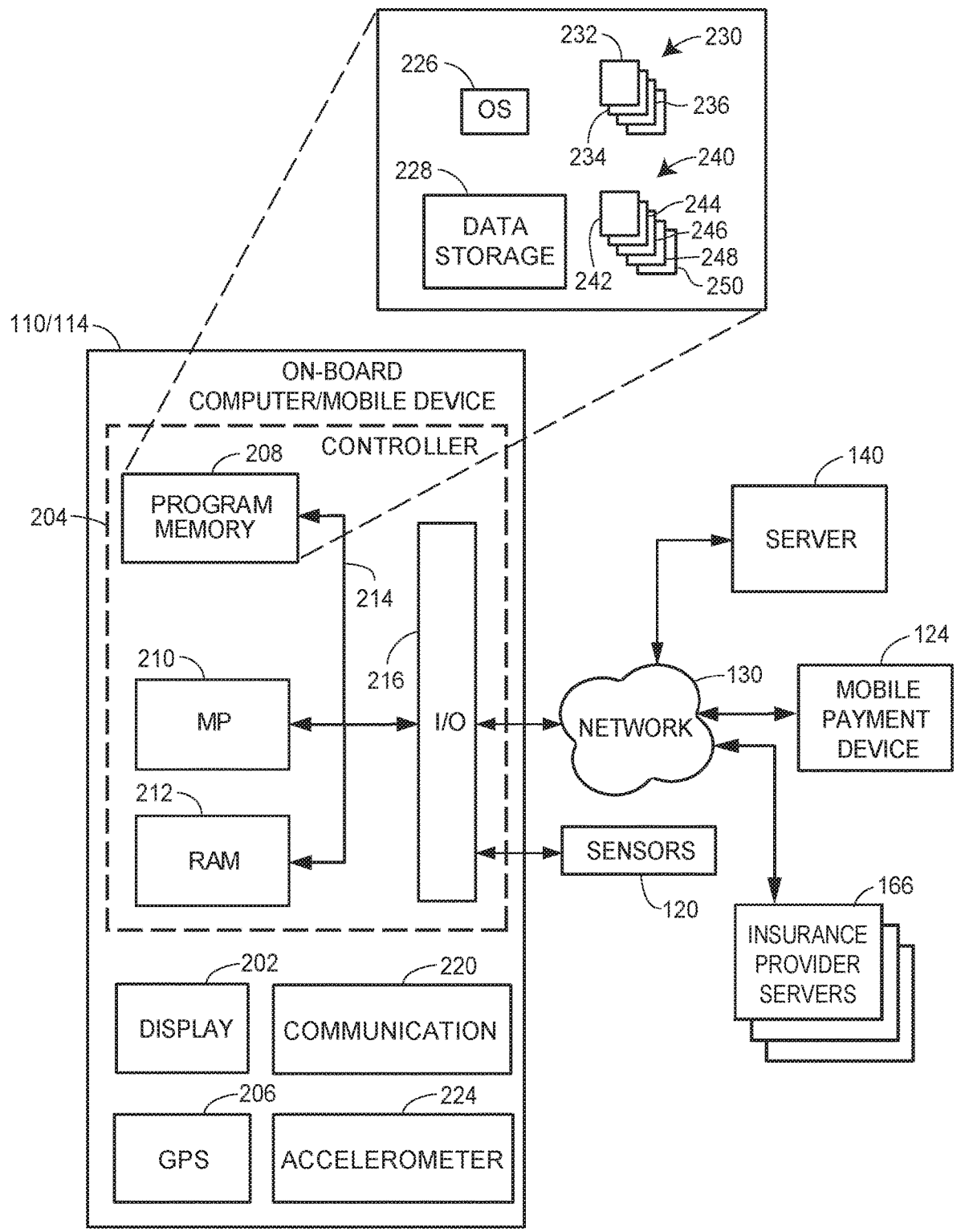
FIG. 2 illustrates a block diagram of an exemplary on-board computer or mobile device.

FIG. 2 illustrates a block diagram of an exemplary mobile device 110 (or any of the client computing devices) or an exemplary on-board computer 114 consistent with the system 100. The mobile device 110 or on-board computer 114 may include a display 202, a GPS unit 206, a communication unit 220, an accelerometer 224, one or more additional sensors (not shown), a user-input device (not shown), and/or, like the server 140, a controller 204. In some embodiments, the mobile device 110 and on-board computer 114 may be integrated into a single device, or either may perform the functions of both. The on-board computer 114 (or mobile device 110) interfaces with the sensors 120 to receive information regarding the vehicle 108 and its environment, which information is used by the autonomous operation features to operate the vehicle 108.

Similar to the controller 155, the controller 204 may include a program memory 208, one or more microcontrollers or microprocessors (MP) 210, a RAM 212, and an I/O circuit 216, all of which are interconnected via an address/data bus 214. The program memory 208 includes an operating system 226, a data storage 228, a plurality of software applications 230, and/or a plurality of software routines 240. The operating system 226, for example, may include one of a plurality of general purpose or mobile platforms, such as the Android™, iOS®, or Windows® systems, developed by Google Inc., Apple Inc., and Microsoft Corporation, respectively. Alternatively, the operating system 226 may be a custom operating system designed for autonomous vehicle operation using the on-board computer 114. The data storage 228 may include data such as user profiles and preferences, application data for the plurality of applications 230, routine data for the plurality of routines 240, and other data related to the autonomous operation features. In some embodiments, the controller 204 may also include, or otherwise be communicatively connected to, other data storage mechanisms (e.g., one or more hard disk drives, optical storage drives, solid state storage devices, etc.) that reside within the vehicle 108.

As discussed with reference to the controller 155, it should be appreciated that although FIG. 2 depicts only one microprocessor 210, the controller 204 may include multiple microprocessors 210. Similarly, the memory of the controller 204 may include multiple RAMs 212 and multiple program memories 208. Although FIG. 2 depicts the I/O circuit 216 as a single block, the I/O circuit 216 may include a number of different types of I/O circuits. The controller 204 may implement the RAMs 212 and the program memories 208 as semiconductor memories, magnetically readable memories, or optically readable memories, for example.

The one or more processors 210 may be adapted and configured to execute any of one or more of the plurality of software applications 230 or any one or more of the plurality of software routines 240 residing in the program memory 208, in addition to other software applications. One of the plurality of applications 230 may be an autonomous vehicle operation application 232 that may be implemented as a series of machine-readable instructions for performing the various tasks associated with implementing one or more of the autonomous operation features. Another of the plurality of applications 230 may be an autonomous communication application 234 that may be implemented as a series of machine-readable instructions for transmitting and receiving autonomous operation information to or from external sources via the communication module 220. Still another application of the plurality of applications 230 may include a client application 236 that may be implemented as a series of machine-readable instructions for performing the various tasks associated with receiving information at, displaying information on, and/or transmitting information from the mobile device 110.

Yet another of the plurality of applications 230 may be a native application and/or web browser, such as Apple's Safari®, Google Android™ mobile web browser, Microsoft Internet Explorer® for Mobile, Opera Mobile™, that may be implemented as a series of machine-readable instructions for receiving, interpreting, and/or displaying web page information from the server 140 while also receiving inputs from the user. Another application of the plurality of applications may include an embedded web browser that may be implemented as a series of machine-readable instructions for receiving, interpreting, and/or displaying web page information from the servers 140.

The plurality of software applications 230 may call various of the plurality of software routines 240 to perform functions relating to autonomous vehicle operation or communication, and functions relating to receiving information at, displaying information on, and/or transmitting information from the mobile device 110. One of the plurality of software routines 240 may be a configuration routine 242 to receive settings from the passenger to configure the operating parameters of an autonomous operation feature. Another of the plurality of software routines 240 may be a sensor control routine 244 to transmit instructions to a sensor 120 and receive data from the sensor 120. Still another of the plurality of software routines 240 may be an autonomous control routine 246 that performs a type of autonomous control, such as collision avoidance, lane centering, or speed control. In some embodiments, the autonomous vehicle operation application 232 may cause a plurality of autonomous control routines 246 to determine control actions required for autonomous vehicle operation. Moreover, one of the plurality of software routines 240 may be a passenger insurance selection routine 248 that receives a selection of a passenger insurance premium from the user and transmits the selection to the server 140 or one of the insurance provider servers 166 via the network 130. Yet another of the plurality of software routines 240 may be a payment routine 250 for receiving payment information from the user and transmitting the payment information to the server 140 or one of the insurance provider servers 166 via the network. Any of the plurality of software applications 230 may be designed to operate independently of the software applications 230 or in conjunction with the software applications 230.

Preferably, a passenger and/or a user may launch the client application 236 from a client computing device, such as the mobile device 110, to communicate with the server 140, the insurance provider servers 166, and/or on-board computer 114 to implement the autonomous vehicle passenger insurance system 100. Additionally, the passenger and/or the user may also launch or instantiate any other suitable user interface application (e.g., the native application or web browser, and/or any other one of the plurality of software applications 230) to access the server 140 to realize the autonomous vehicle passenger insurance system 100.

The controller 204 of the on-board computer 114 may implement the autonomous vehicle operation application 232 to communicate with the sensors 120 to receive information regarding the vehicle 108 and its environment and process that information for autonomous operation of the vehicle 108. In some embodiments including external source communication via the communication component 122 or the communication unit 220, the controller 204 may further implement the autonomous communication application 234 to receive information for external sources, such as other autonomous vehicles, smart infrastructure (e.g., electronically communicating roadways, traffic signals, or parking structures), or other sources of relevant information (e.g., weather, traffic, local amenities). Some external sources of information may be connected to the controller 204 via the network 130, such as the server 140 or internet-connected third-party databases (not shown). Although the autonomous vehicle operation application 232 and the autonomous communication application 234 are shown as two separate applications, it should be understood that the functions of the autonomous operation features may be combined or separated into any number of the software applications 230 or the software routines 240.

In addition to connections to the sensors 120, the mobile device 110 or the on-board computer 114 may include additional sensors, such as the GPS unit 206 or the accelerometer 224, which may provide information regarding the vehicle 108 for autonomous operation and other purposes. Furthermore, the communication unit 220 may communicate with other autonomous vehicles, infrastructure, or other external sources of information to transmit and receive information relating to autonomous vehicle operation.

The communication unit 220 may communicate with the external sources via the network 130 or via any suitable wireless communication protocol network, such as wireless telephony (e.g., GSM, CDMA, LTE, etc.), Wi-Fi (802.11 standards), WiMAX, Bluetooth, infrared or radio frequency communication, etc. Furthermore, the communication unit 220 may provide input signals to the controller 204 via the I/O circuit 216. The communication unit 220 may also transmit sensor data, device status information, control signals, or other output from the controller 204 to one or more external sensors within the vehicle 108, mobile devices 110, on-board computers 114, mobile payment devices 124, servers 140, or insurance provider servers 166. For example, the communication unit 220 may transmit a departure location, a destination location, a departure time, a destination time, or any other suitable vehicle trip usage data to the servers 140, the mobile payment devices 124, and/or the mobile devices 110 for determining a cost associated with the vehicle trip and/or passenger insurance for the vehicle trip.

The mobile device 110 or the on-board computer 114 may include a user-input device (not shown) for receiving instructions or information from the passenger, such as settings relating to an autonomous operation feature. The user-input device (not shown) may include a "soft" keyboard that is displayed on the display 202, an external hardware keyboard communicating via a wired or a wireless connection (e.g., a Bluetooth keyboard), an external mouse, a microphone, or any other suitable user-input device. The user-input device (not shown) may also include a microphone capable of receiving user voice input.

Figure 3:
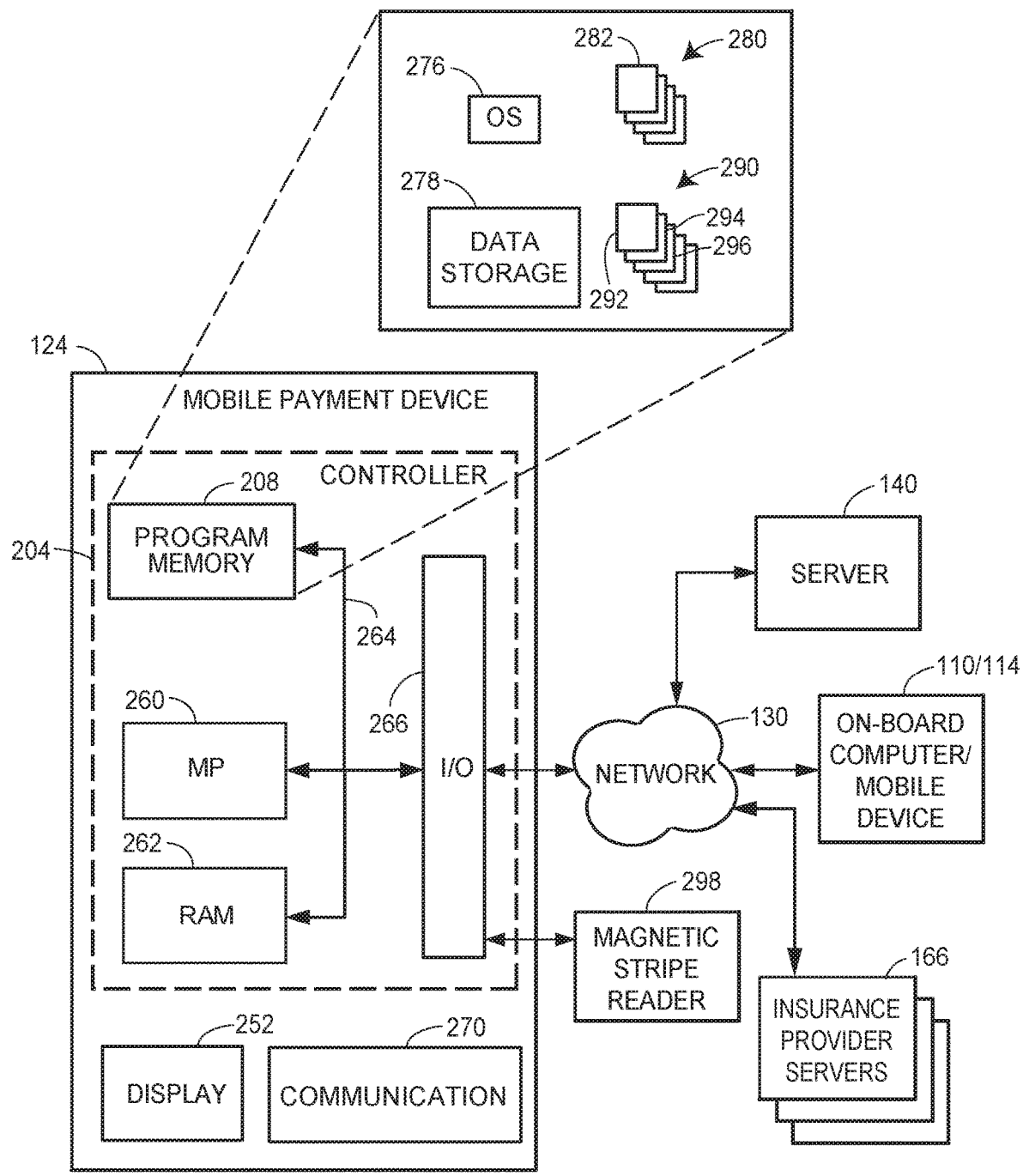
FIG. 3 illustrates a block diagram of an exemplary mobile payment device.

FIG. 3 illustrates a block diagram of an exemplary mobile payment device 124 consistent with the system 100. The mobile payment device 124 may include a display 252, a communication unit 270, a user-input device (not shown), and/or, like the server 140, a controller 254. The mobile payment device 124 may interface with a magnetic stripe reader 298 and/or a computer chip reader to receive payment information from a passenger and to charge the passenger for the passenger insurance policy and/or for the vehicle trip. The magnetic stripe reader 298 may include a magnetic read head which may read payment information stored as magnetic fields on a magnetic stripe, such as a credit card number, expiration date, security code, etc., stored on the magnetic stripe of a credit card. The magnetic read head may read the magnetic stripe when a passenger swipes the credit card across the magnetic read head, touches the credit card to the magnetic read head, or in any other suitable manner. In any event, the magnetic stripe reader 298 may transform the received magnetic fields to electronic payment information which may be transmitted to the mobile payment device 124. In additional or alternative embodiments, the computer chip reader may read payment information stored electronically in integrated circuits embedded on a credit card. The payment information may then be transmitted to the mobile payment device 124.

Similar to the controller 155, the controller 254 may include a program memory 258, one or more microcontrollers or microprocessors (MP) 260, a RAM 262, and an I/O circuit 266, all of which are interconnected via an address/data bus 264. The program memory 258 includes an operating system 276, a data storage 278, a plurality of software applications 280, and/or a plurality of software routines 290. The operating system 276, for example, may include one of a plurality of general purpose or mobile platforms, such as the Android™, iOS®, or Windows® systems, developed by Google Inc., Apple Inc., and Microsoft Corporation, respectively. Alternatively, the operating system 226 may be a custom operating system designed for processing payments using the mobile payment device 124. The data storage 278 may include data such as encryption data, application data for the plurality of applications 280, routine data for the plurality of routines 290, and other data related to payment processing.

As discussed with reference to the controller 155, it should be appreciated that although FIG. 3 depicts only one microprocessor 260, the controller 254 may include multiple microprocessors 260. Similarly, the memory of the controller 254 may include multiple RAMs 262 and multiple program memories 258. Although FIG. 3 depicts the I/O circuit 266 as a single block, the I/O circuit 266 may include a number of different types of I/O circuits. The controller 254 may implement the RAMs 262 and the program memories 258 as semiconductor memories, magnetically readable memories, or optically readable memories, for example.

The one or more processors 260 may be adapted and configured to execute any of one or more of the plurality of software applications 280 or any one or more of the plurality of software routines 290 residing in the program memory 258, in addition to other software applications. One of the plurality of applications 280 may be a passenger insurance application 282 that may be implemented as a series of machine-readable instructions for providing passenger insurance to the user during the vehicle trip.

The plurality of software applications 280 may call various of the plurality of software routines 290 to perform functions relating to receiving and processing payments. One of the plurality of software routines 290 may be a vehicle identification information routine 292 to obtain identification information for the vehicle 108, for example, from the on-board computer 114, to determine an appropriate passenger insurance premium for the vehicle trip. Another of the plurality of software routines 290 may be a vehicle trip information routine 294 to receive information corresponding to the vehicle trip and determine a cost associated with the vehicle trip and/or passenger insurance for the vehicle trip. Still another of the plurality of software routines 290 may be a payment information routine 296 to transmit and receive payment information to the server 140 via the network 130.

Furthermore, the communication unit 720 may communicate with external sources to transmit and receive payment information. The communication unit 270 may communicate with the external sources via the network 130 or via any suitable wireless communication protocol network, such as wireless telephony (e.g., GSM, CDMA, LTE, etc.), Wi-Fi (802.11 standards), WiMAX, Bluetooth, infrared or radio frequency communication, etc. Furthermore, the communication unit 270 may provide input signals to the controller 254 via the I/O circuit 256. The communication unit 270 may also receive input from the vehicle 108, mobile devices 110, on-board computer 114, servers 140, or insurance provider servers 166. For example, the communication unit 270 may receive a departure location, a destination location, a departure time, a destination time, or any other suitable vehicle trip usage data from the servers 140, the on-board computer 114, and/or the mobile devices 110 for determining a cost associated with the vehicle trip and/or passenger insurance for the vehicle trip. Moreover, the communication unit 270 may transmit the received payment to one of the insurance provider servers corresponding to the insurance provider selected by the user for providing passenger insurance.

The mobile payment device 124 may include a user-input device (not shown) for receiving instructions or information from the passenger. The user-input device (not shown) may include a "soft" keyboard that is displayed on the display 252, an external hardware keyboard communicating via a wired or a wireless connection (e.g., a Bluetooth keyboard), an external mouse, a microphone, or any other suitable user-input device. The user-input device (not shown) may also include a microphone capable of receiving user voice input.

In one embodiment, as shown in FIG. 2, to access the server 140 the user may execute the client application 236 on the mobile device 110. Using the client application 236, the user may request server data (not shown) by navigating a series of client application screens. FIGS. 4A-E depict client application pages and/or screens that the server 140 may transmit in various embodiments of the autonomous vehicle passenger insurance system 100. However, the screens depicted in FIGS. 4A-E are merely illustrations of an exemplary embodiment. In some embodiments, the server 140 may transmit web pages.

In any event, the user may launch the client application 236 via any suitable manner, such as touch-selecting a client application icon (not shown) on the display 202 of the mobile device 110, double-clicking on the client application icon via a mouse of a computer and/or a trackpad of a laptop. After the user launches the client application 236, a vehicle identification screen of the client application 236 may be displayed to the user on the mobile device 110.

Figure 4A:
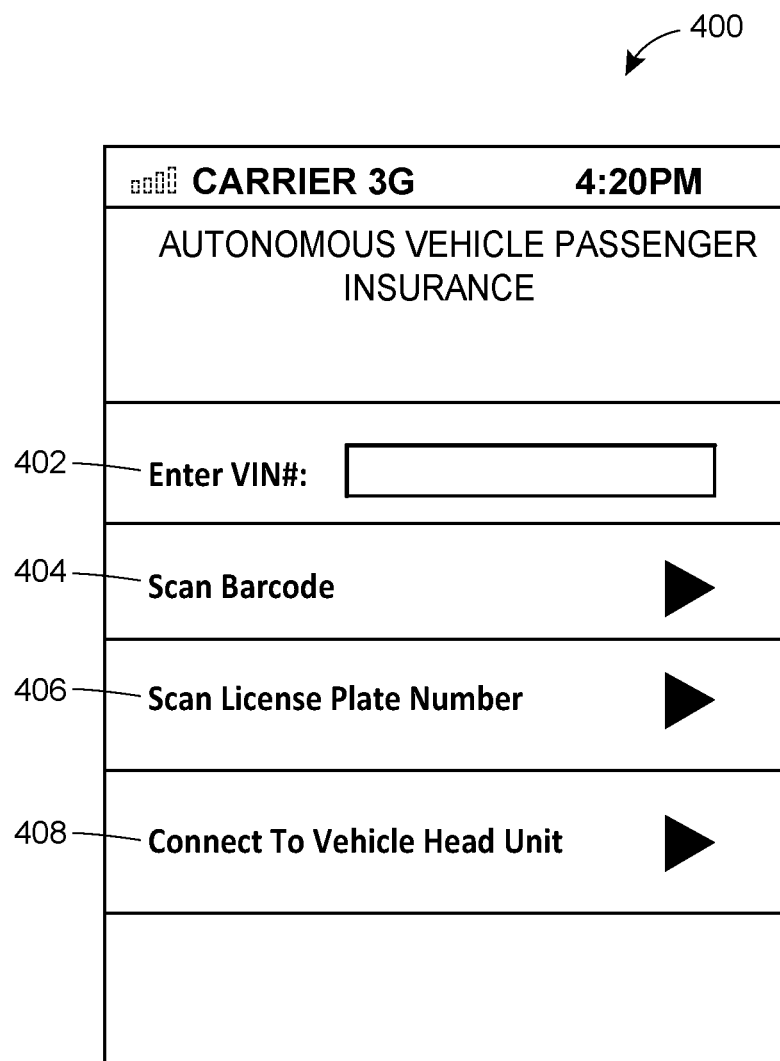
FIG. 4A illustrates an exemplary vehicle identification screen of a client application in accordance with the presently described embodiments.

FIG. 4A illustrates a vehicle identification screen 400 which may include one or several user controls 402-408 for entering vehicle identification information related to the vehicle 108. Vehicle identification information may include any suitable information which may identify the vehicle such as, for example, the make, model, and year, of the vehicle, the owner of the vehicle, etc.

The user may enter a VIN number 402 via a free-form text field using the user-input device such as a "soft" keyboard. In some embodiments, the server 140 may retrieve public information associated with the VIN number to determine additional vehicle characteristics which may not be determined directly from the VIN number such as a Vehicle History Report (VHR) from the Department of Motor Vehicles (DMV). The user may also select an option to scan a barcode 404 disposed within the vehicle which may provide vehicle identification information for the vehicle, such as the make, model, and year of the vehicle, the type and version of the operating system which controls autonomous feature in the vehicle, the type and version of each of the autonomous operation features, an operation of each of the autonomous operation features, location information for the vehicle, etc. If the user selects this option, for example by touch-selecting the section corresponding to "Scan Barcode" 404, an image capture screen (not shown) may be displayed for receiving a barcode image. In some embodiments, the received barcode image may be transmitted to the server 140, which in turn, may translate the barcode image into vehicle identification information. In other embodiments, the received barcode image may be transformed into vehicle identification information at the mobile device 110.

Similarly, if the user selects the option to scan a license plate number 406, an image capture screen (not shown) may be displayed for receiving an image depicting the license plate of the vehicle 108. The server 140 may retrieve characteristics of the vehicle 108 based on the vehicle's license plate number by retrieving public records corresponding to the license plate number, for example, from the DMV.

Additionally, the user may select an option to connect to the vehicle head unit 408 or telematics unit. If the user selects this option, the client application 236 may establish a connection between the mobile device 110 and the onboard computer via the network 130 or via the direct communication link 126 between the mobile device and the on-board computer 114 (e.g., a Bluetooth connection). The mobile device 110 may communicate with the on-board computer 114 to obtain vehicle identification information stored in the on-board computer such as the make, model, and year of the vehicle, the owner of the vehicle, manufacturers of various autonomous operation features within the vehicle, the type and version of the operating system which controls autonomous feature in the vehicle, the type and version of each of the autonomous operation features, an operation of each of the autonomous operation features, etc.

The mobile device 110 may then transmit the vehicle identification information to the server 140. Based on the vehicle identification information, the server 140 may identify the vehicle 108 and corresponding characteristics for the vehicle 108, such as autonomous operation features within the vehicle, a type and version of each of the autonomous operation features, an operation of each of the autonomous operation features, a type and version of autonomous operation feature control software, settings of the autonomous operation features, the age of the vehicle, a location associated with the vehicle such as a garaging location components within the vehicle, components within the vehicle such as the type of transmission, the engine type, etc., for example, using the database 146 of FIG. 1. The server 140 may also compare the corresponding characteristics for the vehicle 108 to characteristics for other autonomous vehicles to identify other autonomous vehicles having similar vehicle characteristics. When a match is identified, the server 140 may retrieve previously obtained passenger insurance premiums and indications of their corresponding insurance providers for the matching set of stored vehicle characteristics.

Additionally or alternatively, when a match is not identified and for additional or updated passenger insurance premiums, the server 140 may search public information (e.g., the Internet) for indications of passenger insurance premiums offered by insurance providers. Moreover, in some embodiments, the server 140 may communicate via the network 130 with the insurance provider servers 166 to obtain indications of passenger insurance premiums.

Each insurance provider may offer several passenger insurance premiums for a particular set of vehicle characteristics based on a vehicle usage unit. For example, an insurance provider may offer a first passenger insurance premium corresponding to a particular cost based on the distance (or a planned distance) of the vehicle trip (e.g., $0.40 a mile), a second passenger insurance premium corresponding to a particular cost based on the duration of the vehicle trip (e.g., $0.10 a minute), and a third, flat rate insurance premium regardless of distance or duration (e.g., $15 a vehicle trip), where each passenger insurance premium is offered for the same set of vehicle characteristics.

In some embodiments, each insurance provider may offer passenger insurance premiums which provide different types of insurance coverage included in the policy. For example, an insurance provider may offer a passenger insurance premium for an insurance policy which includes death and dismemberment coverage, a passenger insurance premium for an insurance policy which includes personal injury coverage, a passenger insurance premium for an insurance policy which includes trip protection coverage, or a passenger insurance premium for an insurance policy which includes any suitable combination of these or any other coverage types. In some embodiments, the user may select which types of passenger insurance coverage will be included in the policy, and the server 140 may obtain passenger insurance premiums based on the user's coverage selections. In other embodiments, the server 140 may obtain passenger insurance premiums for default passenger insurance coverage (e.g., personal injury coverage, death and dismemberment coverage, and trip protection coverage for every passenger insurance policy).

In some scenarios, for example when the user pre-purchases passenger insurance for a vehicle trip via the user's laptop or desktop computer when booking the vehicle trip with a transportation service provider (e.g., a driverless taxi service), the user may not be prompted to enter vehicle identification information. Instead, passenger insurance premiums may be obtained based on non-vehicular factors. For example, the passenger insurance premiums may not be based on characteristics specific to a particular vehicle such as autonomous operation features within the vehicle, a type and version of autonomous operation feature control software, etc. Instead, the server 140 may search public information (e.g., the Internet) or communicate with insurance provider servers 166 to obtain indications of passenger insurance premiums based on a vehicle usage unit and which are not specific to a particular set of vehicle characteristics. Moreover, in such a scenario, the server 140 may transmit web pages (depicting the example screens shown in FIGS. 4B-E) to be displayed on the web browser of the user's laptop or desktop computer. In other embodiments, the server 140 may transmit the web pages to a transportation service provider server, which may in turn, display the web pages via a transportation service provider host page on the web browser of the user's laptop or desktop computer. In this manner, the user may book the vehicle trip and pre-purchase passenger insurance for the booked vehicle trip via the transportation service provider host website. The passenger may pre-purchase the passenger insurance using a credit card or an online payment account such as (PayPal™ Bitcoin™, Google Wallet™, Apple Pay™, etc.).

Figure 4B:
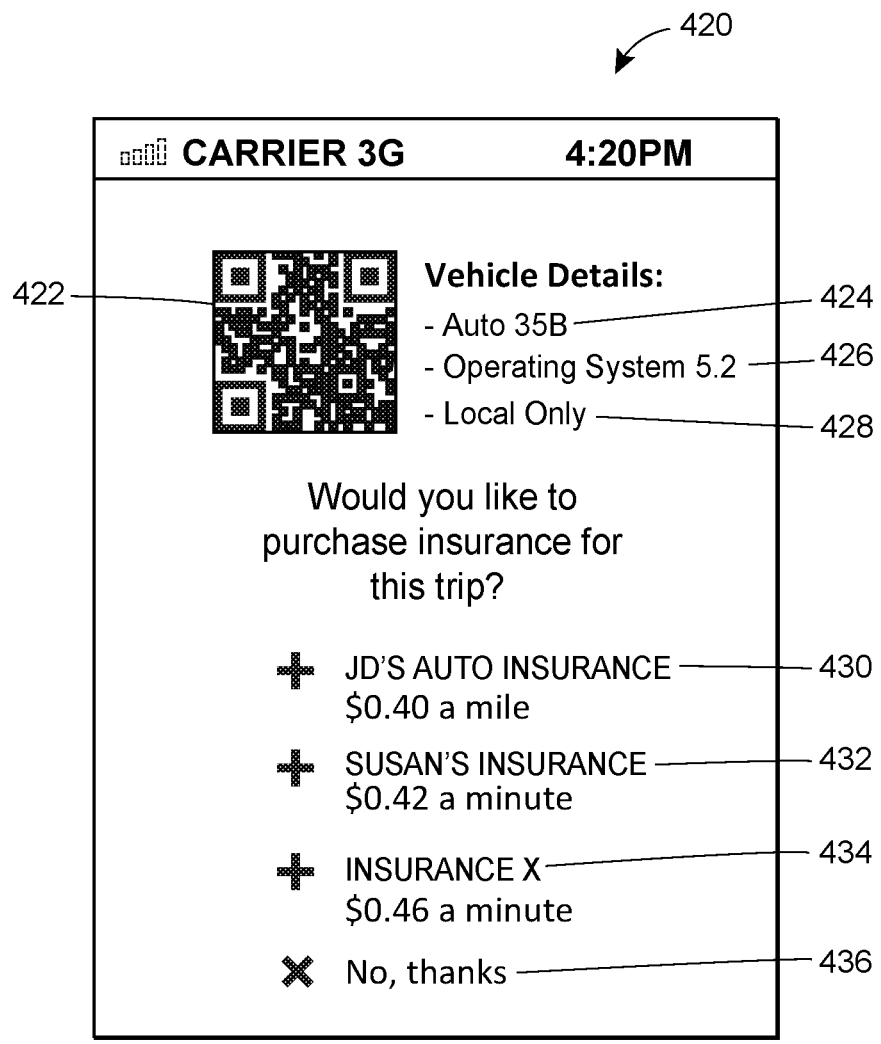
FIG. 4B illustrates an exemplary passenger insurance selection screen of a client application in accordance with the presently described embodiments.
Figure 4D:
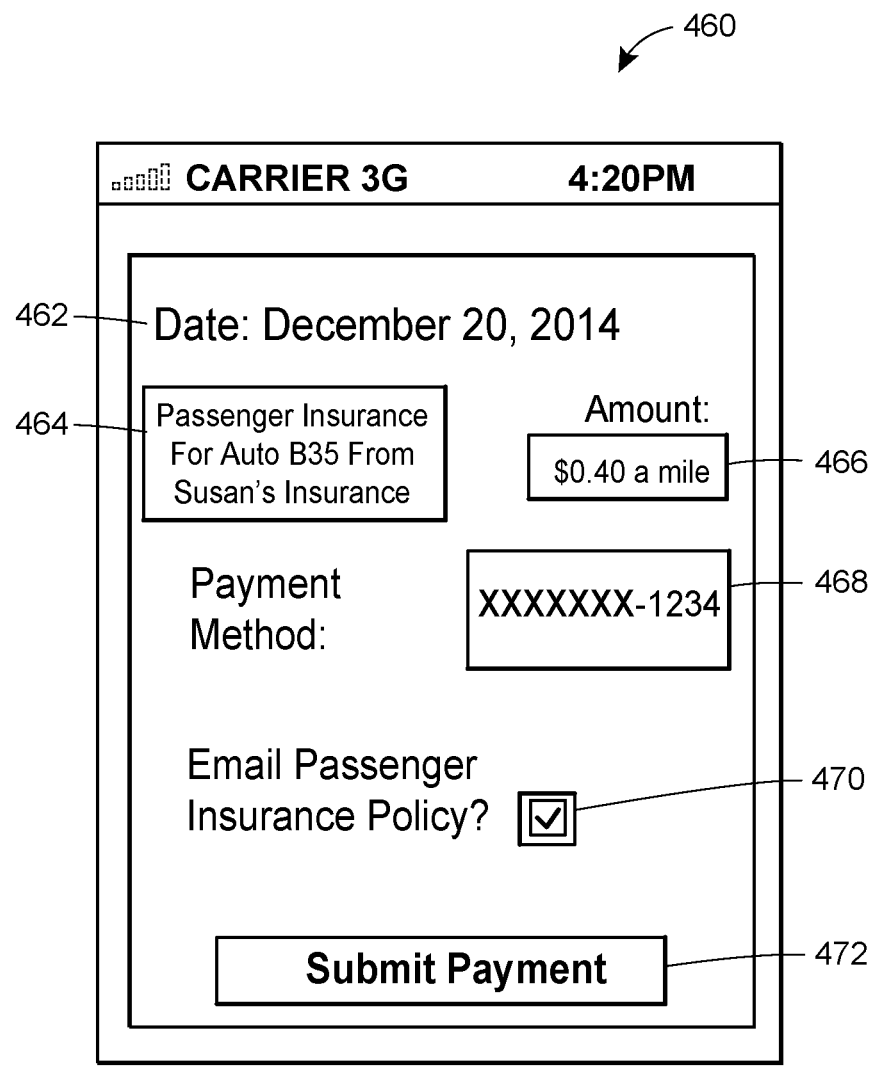
FIG. 4D illustrates an exemplary order review screen of a client application in accordance with the presently described embodiments.

In any event, the determined passenger insurance premiums may be displayed to the user via a passenger insurance selection screen of the client application 236 on the mobile device 110. FIG. 4B illustrates a passenger insurance selection screen 420, which may include the received vehicle identification information such as a barcode 422 and the make and model of the vehicle 424.

The passenger insurance selection screen 420 may also include corresponding characteristics of the vehicle 108, for example, as determined by the server 140 and/or by the mobile device 110. For example, the operating system for controlling operation of the vehicle may be displayed such as "Operating System 5.2" 426, as well as an indication of geographical boundaries in which the vehicle 108 may travel such as "Local Only" 428, indicating that the vehicle 108 may only travel on local roads and may not travel on highways, freeways, etc.

Additionally, the passenger insurance selection screen 420 may include one or more user controls 430, 432, 434, and 436 for selecting a passenger insurance premium corresponding to an insurance provider and/or for declining the offer to purchase passenger insurance for the vehicle trip. In the exemplary passenger insurance selection screen 420, the user may select to purchase passenger insurance for the vehicle trip from JD's Auto Insurance at a cost of "$0.40 a mile" by touch-selecting or double clicking on the plus sign adjacent to the "$0.40 a mile" indication 430. Alternatively, the user may select to purchase passenger insurance for the vehicle trip from Susan's Insurance at a cost of "$0.42 a mile" by touch-selecting or double clicking on the plus sign adjacent to the "$0.42 a mile" indication 432. The user may also select to purchase passenger insurance for the vehicle trip from Insurance X at a cost of "$0.46 a mile" by touch-selecting or double clicking on the plus sign adjacent to the "$0.46 a mile" indication 434, or may decline passenger insurance for the vehicle trip by touch-selecting or double clicking on the 'X' adjacent to the "No, thanks" indication 436. In other embodiments, the user may select one of the passenger insurance premiums displayed on the passenger insurance selection screen 420 via any other suitable user control.

In some embodiments, the server 140 may categorize the passenger insurance premiums and their respective insurance providers based on vehicle usage unit and rank the passenger insurance premiums according to cost for a particular vehicle usage unit. For example, JD's Auto Insurance may be ranked ahead of Susan's Insurance for passenger insurance premiums based on distance, because JD's Auto Insurance offers a passenger insurance premium of $0.40 a mile, whereas Susan's Insurance offers a passenger insurance premium of $0.42 a mile. However, Susan's Insurance may be ranked ahead of JD's Auto Insurance for passenger insurance premiums based on duration, if for example, Susan's Insurance offers a passenger insurance premium of $0.14 a minute and JD's Auto Insurance offers a passenger insurance premium of $0.18 a minute. The passenger insurance premiums and their respective insurance providers may then be displayed in the passenger insurance selection screen 420 in order of their respective ranking. For example, the highest ranking passenger insurance premium may be displayed at the top of the passenger insurance selection screen 420, while the lowest ranking passenger insurance premium may be displayed at the bottom of the passenger insurance selection screen 420.

Also, in some embodiments, the server 140 may obtain a predetermined threshold number of passenger insurance premiums and their respective insurance providers to display on the passenger insurance selection screen 420. The passenger insurance premiums which may be ranked at or above the predetermined threshold number may be displayed on the passenger insurance selection screen 420. For example, if the predetermined threshold number is seven passenger insurance premiums, the seven highest ranking passenger insurance premiums and their respective insurance providers may be displayed on the passenger insurance selection screen 420.

In other embodiments, the passenger insurance premiums and their respective insurance providers may be ranked and displayed in any other suitable manner such as alphabetically, based on a customer satisfaction rating for each insurance provider, based on the location of the nearest agent for each insurance provider, etc. In some embodiments, insurance providers may have the option to pay (or provide commissions on the sale of insurance policies) for a premium listing where the insurance providers who purchase the premium listing may be displayed at the top of the passenger insurance selection screen 420 regardless of the cost of their respective insurance premiums. Moreover, in some scenarios, insurance providers may offer temporary promotional discounts on passenger insurance premiums. As a result, these insurance providers may be ranked and displayed higher on the passenger insurance selection screen 420 based on the reduced price of the insurance providers' passenger insurance premiums according to the promotional discount.

While the passenger insurance selection screen 420 includes three insurance premiums, this is merely for ease of illustration only. The passenger insurance selection screen 420 may include any suitable number of insurance premiums. Moreover, while the passenger insurance selection screen 420 includes insurance premiums based on one type of vehicle usage unit (distance or planned distance), the client application 236 may include passenger insurance selection screens (not shown) for several types of vehicle usage units and for several types of insurance coverage.

For example, the client application 236 may include a passenger insurance selection screen which includes insurance premiums based on the duration of the vehicle trip; a passenger insurance selection screen which includes flat rate insurance premiums for the entire vehicle trip regardless of distance and duration; a passenger insurance selection screen which includes insurance premiums corresponding to insurance policies which provide personal injury coverage; a passenger insurance selection screen which includes insurance premiums corresponding to insurance policies which provide death and dismemberment coverage; a passenger insurance selection screen which includes insurance premiums corresponding to insurance policies which provide trip protection coverage; or a passenger insurance selection screen which includes insurance premiums based on any suitable combination of distance, duration, and/or types of insurance coverage (e.g., an insurance premium based on the distance of the vehicle trip and corresponding to an insurance policy which provides trip protection coverage and personal injury coverage).

Additionally, the passenger insurance premiums may be displayed on one or multiple passenger insurance selection screens. For example, using a "swipe" gesture, the user may toggle between passenger insurance selection screens of the client application 236, the user may select from several tabs where each tab corresponds to a passenger insurance selection screen, or the user may toggle between passenger selection screens in any other suitable manner.

In another example, the client application 236 may include a first passenger insurance selection screen which includes insurance premiums from several insurance providers for "basic" insurance coverage (e.g., personal injury coverage), a second passenger insurance selection screen which includes insurance premiums from several insurance providers for "typical" insurance coverage (e.g., personal injury coverage, and death and dismemberment coverage), and a third passenger insurance selection screen which includes insurance premiums from several insurance providers for "comprehensive" insurance coverage (e.g., personal injury coverage, death and dismemberment coverage, and trip protection coverage). Each of the passenger insurance selection screens may rank insurance providers according to the cost of their corresponding insurance premiums, and the highest ranking passenger insurance premium may be displayed at the top of the passenger insurance selection screen.

Additionally, in an embodiment, the user may be able to select from an "Advanced" set of options on the passenger insurance selection, and the passenger insurance selection screen may display insurance providers and their respective passenger insurance premiums for insurance policies according to the "Advanced" set of options. The insurance providers who offer insurance policies that match the criteria specified in the "Advanced" set of options may be ranked according to the cost of their corresponding insurance premiums, and the highest ranking passenger insurance premium may be displayed at the top of the passenger insurance selection screen. The "Advanced" set of options may include for example, general liability coverage, death and dismemberment coverage, trip protection coverage, theft coverage, low deductibles, or any other suitable criteria for a passenger insurance policy in an autonomous vehicle.

Moreover, each passenger selection screen may include a search field for searching for a particular insurance provider, and/or one or more user controls for selecting preferred insurance providers. For example, the user may select a preferred insurance provider by touch-selecting or double clicking on a check box adjacent to the name of the insurance provider. The client application 236 may store the user's preferred insurance providers at the mobile device and/or the server 140, and the user's preferred insurance providers may be displayed at the top of the passenger insurance selection screen regardless of the cost of their corresponding premiums.

In any event, when the user selects one of the insurance premiums and respective insurance provider, for example, by touch-selecting the plus sign adjacent to the "$0.42 a mile" indication 432, the client application 236 may facilitate the purchase of the selected insurance premium with the corresponding insurance provider. In some embodiments, the selected user control may include a direct link to a web page of the insurance provider for purchasing the selected passenger insurance premium. The user may then follow the steps laid out by the insurance provider web page to complete the purchase.

In an embodiment, the user may complete the purchase using the client application 236, and the client application 236 may receive and display the insurance provider web page. The client application 236 or the server 140 may communicate with the insurance provider server 166, and the information obtained from the user at the client application 236 may be transmitted to the insurance provider server 166, either directly or via the server 140. For example, the direct link may be to a payment information web page of the insurance provider, where the insurance provider requests payment information from the user. The server 140 may receive the web page from the insurance provider server 166, and may transmit the web page to be displayed at the client application 236. When the user enters the payment information, the client application 236 may transmit the payment information to the server 140 which may forward the payment information to the insurance provider server 166. In other embodiments, the server 140 may establish a direct communication between the client application 236 and the insurance provider server 166 when the user selects an insurance premium and corresponding insurance provider.

In yet other embodiments, the server 140 and the client application 236 may complete the purchase of the passenger insurance policy, and the server 140 may communicate with the corresponding insurance provider to transmit the received payment and to receive the passenger insurance policy. In such an embodiment, the insurance provider may agree ahead of time to allow the server 140 to complete the purchase of passenger insurance on behalf of the insurance provider.

In this scenario, the client application 236 may display a payment information screen 440, such as that depicted in FIG. 4C. The payment information screen 440 may receive payment information from the user to complete the purchase of the insurance policy corresponding to the selected insurance premium. The user may enter credit/debit card information such as a first name 442, last name 444, credit card number 446, credit card expiration date 448, and credit card security code 450. The credit/debit card information may be entered via free-form text fields using the user-input device such as a "soft" keyboard. In addition or as an alternative to credit/debit card information, the payment information screen 440 may also include input fields for entering electronic bank account information, or any other suitable electronic payment information.

In any event, once the user enters the payment information, the user may select the "Submit" button 454. The client application 236 may then display an order review screen 460, such as that depicted in FIG. 4D. The order review screen 460 may include the date 462, an indication of the type of insurance purchased and the corresponding insurance provider 464 (e.g., a passenger insurance policy from Susan's Insurance for the vehicle trip), the selected insurance premium 466 (e.g., $0.42 a mile), the payment method 468 used for purchasing the passenger insurance, and/or a user control for selecting whether to receive the purchased insurance policy and/or a confirmation that the passenger has passenger insurance coverage for the vehicle trip, at the user's email address 470. In some embodiments, for example, when the user pre-purchases passenger insurance for the vehicle trip via the user's laptop or desktop computer, the order review screen 460 may include an indication of the date and time of the scheduled vehicle trip. In some embodiments, in addition to emailing the user the insurance policy, the insurance policy and/or the confirmation may be displayed at the client application 236 in an insurance policy screen (not shown). Furthermore, a "Submit Payment" button 472 may also be included in the order review screen 460 for the user to submit a payment to purchase the passenger insurance for the vehicle trip.

When the user selects the "Submit Payment" button 472, the server 140 may transmit a request to the insurance provider server 166 for the selected insurance provider to generate and transmit an insurance policy corresponding to the selected insurance premium and/or the confirmation. Accordingly, the insurance provider server 166 may transmit the insurance policy and/or the confirmation to the server 140, which may in turn, transmit the insurance policy and/or the confirmation to be displayed at the client application 236 on the mobile device 110 or may transmit the insurance policy and/or the confirmation to the user's email address. Moreover, the user may be required to electronically sign the passenger insurance policy and/or the confirmation thereby making the agreement for passenger insurance coverage for the vehicle trip binding. Also, in some embodiments, when the server 140 transmits the confirmation to the mobile device 110, the confirmation may include a link to current policies "on file" for the insurance provider, so that the user may view a similar passenger insurance policy while the insurance provider server 166 generates the passenger insurance policy for the user.

The payment method 468 may include an indication (such as the last four digits) of the credit card number entered at the payment information screen 440. Moreover, the selected insurance premium 466 may include an indication of a vehicle usage unit. If the selected insurance premium 466 is a flat rate insurance premium for the entire vehicle trip regardless of distance and/or duration, the selected credit card number may be charged the amount of the flat rate insurance premium. The server 140 may then forward the charged amount to the insurance provider server 166 for the selected insurance provider. If the selected insurance premium 466 depends on the duration and/or distance of the vehicle trip, then the total payment amount may not be charged until the vehicle trip is completed. However, in some embodiments, the mobile device 110, the on-board computer 114 and/or the server 140 may determine a planned distance for the vehicle trip. For example, if the user requests a vehicle trip from her apartment to her place of business and the selected insurance premium depends on the distance of the vehicle, then the distance from the user's apartment to her place of business may be determined as a planned distance, and the server 140 may determine the total payment amount based on the planned distance and may charge the selected credit card number.

In other embodiments, to determine the total payment amount, the server 140 may receive vehicle trip information from the mobile device 110, or the on-board computer 114. For example, when the vehicle 108 picks up the user, the mobile device 110 and/or the on-board computer 114 may determine a departure time and/or a departure location for the vehicle trip. When the vehicle 108 arrives at the destination, the mobile device 110 and/or the on-board computer 114 may determine a destination time, a destination location, a total distance traveled during the vehicle trip (or a planned distance), an estimated duration of the vehicle trip, etc. In some embodiments, the vehicle trip information may be determined based on sensor data generated by the sensors 120 in the vehicle 108 or the mobile device 110. The vehicle trip information may then be transmitted to the server 140, and the server 140 may determine the total payment amount based on the vehicle trip information.

FIG. 4E illustrates a passenger insurance receipt screen 476 which may include the total payment amount charged to a user based on the vehicle trip information. The passenger insurance receipt screen 476 may include vehicle trip information such as the distance (or a planned distance) of the vehicle trip 478, and the estimated duration of the vehicle trip 480. Moreover, the passenger insurance receipt screen 476 may include the amount of the passenger insurance premium per vehicle usage unit such as $0.15 a minute 482, and $0 a mile 484. A total payment amount 486 may also be displayed, and may be determined by multiplying, aggregating, and/or combining in any other suitable manner the vehicle trip information and the amount of the passenger insurance premium per vehicle usage unit. The passenger insurance receipt screen 476 may also display an indication of the credit card 488 which is charged the payment amount, and the amount billed to the credit card 490. The server 140 may then forward the charged amount to the insurance provider server 166 for the selected insurance provider.

Figure 4F:
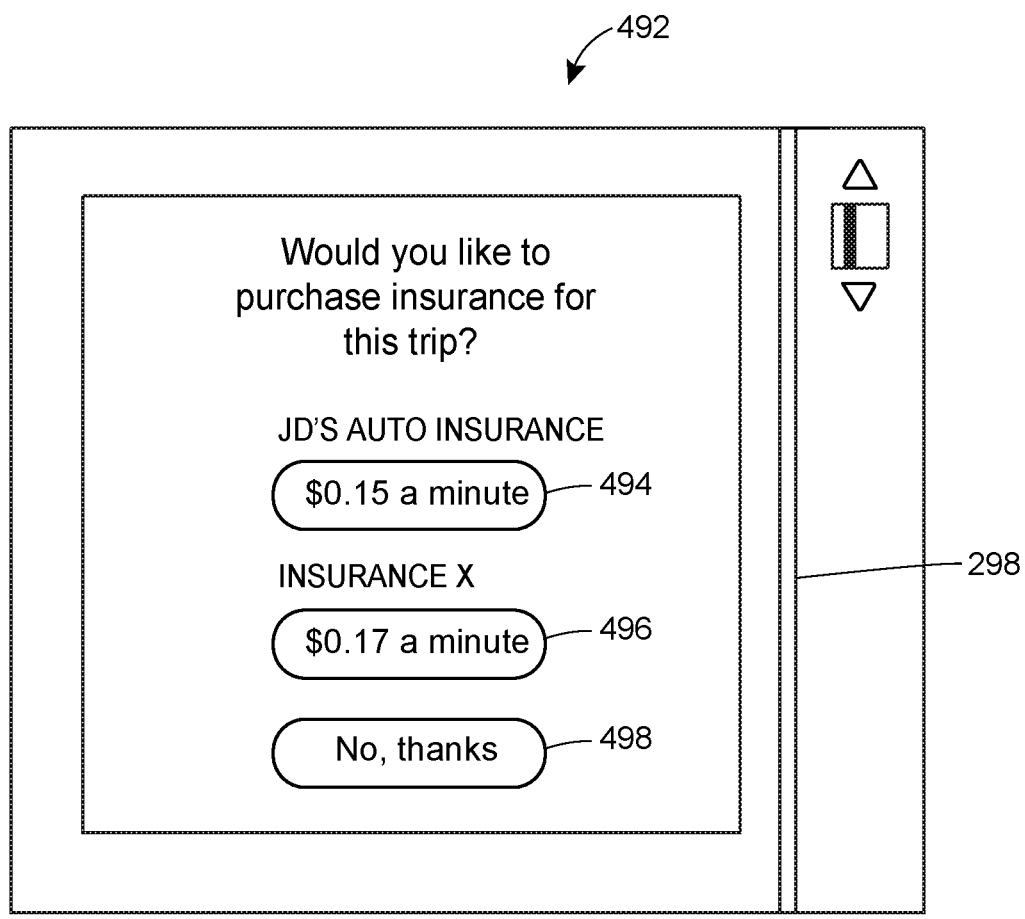
FIG. 4F illustrates an exemplary passenger insurance selection screen of a mobile payment device in accordance with the presently described embodiments.

As mentioned above, as shown in FIG. 3, to access the server 140 the user may execute the passenger insurance application 282 on the mobile payment device 124. Using the passenger insurance application 282, the user may request server data (not shown) by navigating a series of passenger insurance application screens. FIG. 4F depicts a passenger insurance application page and/or screen that the server 140 may transmit to the mobile payment device 124 in various embodiments of the autonomous vehicle passenger insurance system 100. In this manner, a passenger without a mobile device may purchase passenger insurance for a vehicle trip. Moreover, in this manner the passenger may pay for passenger insurance as well as the cost of the vehicle trip (e.g., the cab fare) in one payment.

However, the screen depicted in FIG. 4F is merely an illustration of an exemplary embodiment. In some embodiments, in addition or as an alternative to the screen depicted in FIG. 4F, the screens depicted in FIGS. 4A-E may also be passenger insurance application screens displayed by the passenger insurance application 282 of the mobile payment device 124.

In any event, the user may launch the passenger insurance application 282 from the mobile payment device 124 in any suitable manner, such as touch selecting the display 252 of the mobile payment device 124, or the passenger insurance application 282 may automatically launch at the beginning of the vehicle trip.

In some embodiments, the mobile payment device 124 may store vehicle identification information for the vehicle 108 when the mobile payment device 124 is assigned to a particular vehicle. For example, when the mobile payment device 124 is placed within a vehicle, the mobile payment device 124 may communicate with the on-board computer 114 of the vehicle to receive vehicle identification information. In other embodiments, the mobile payment device 124 may obtain vehicle identification information from the user or from a transportation service provider by for example, using the vehicle identification screen 400 depicted in FIG. 4A.

The mobile payment device 124 may transmit the vehicle identification information to the server 140 which may in turn, identify corresponding characteristics of the vehicle and compare the corresponding characteristics for the vehicle 108 to characteristics for other autonomous vehicles to identify other autonomous vehicles having similar vehicle characteristics. For example, the server 140 may compare autonomous operation features, a type and version of each of the autonomous operation features, an operation of each of the autonomous operation features, a type and version of autonomous operation feature control software, settings of the autonomous operation features, the age, the type of transmission, the engine type, etc., of the vehicle to other autonomous vehicles.

When a match is identified, the server 140 may retrieve previously obtained passenger insurance premiums and indications of their corresponding insurance providers for the matching set of stored vehicle characteristics.

Additionally or alternatively, when a match is not identified and for additional or updated passenger insurance premiums, the server 140 may search public information (e.g., the Internet) for indications of passenger insurance premiums offered by insurance providers. Moreover, in some embodiments, the server 140 may communicate via the network 130 with the insurance provider servers 166 to obtain indications of passenger insurance premiums.

In some embodiments, the mobile payment device 124 may store the passenger insurance premiums for all subsequent trips within the vehicle until the mobile payment device 124 is no longer assigned to the vehicle 108, for example, until the mobile payment device 124 cannot communicate with the on-board computer 114 of the vehicle 108. In other embodiments, the mobile payment device 124 may transmit the vehicle identification information to the server 140 periodically and/or each time a vehicle trip is initiated to receive real-time or at least near real-time updates to the passenger insurance premiums.

Each insurance provider may offer several passenger insurance premiums for a particular set of vehicle characteristics based on a vehicle usage unit. For example, an insurance provider may offer a first passenger insurance premium corresponding to a particular cost based on the distance (or a planned distance) of the vehicle trip (e.g., $0.40 a mile), a second passenger insurance premium corresponding to a particular cost based on the duration of the vehicle trip (e.g., $0.10 a minute), and a third, flat rate insurance premium regardless of distance or duration (e.g., $15 a vehicle trip), where each passenger insurance premium is offered for the same set of vehicle characteristics.

In some embodiments, each insurance provider may offer passenger insurance premiums which provide different types of insurance coverage included in the policy. For example, an insurance provider may offer a passenger insurance premium for an insurance policy which includes death and dismemberment coverage, a passenger insurance premium for an insurance policy which includes personal injury coverage, a passenger insurance premium for an insurance policy which includes trip protection coverage, or a passenger insurance premium for an insurance policy which includes any suitable combination of these or any other coverage types. In some embodiments, the user may select which types of passenger insurance coverage will be included in the policy, and the server 140 may obtain passenger insurance premiums based on the user's coverage selections. In other embodiments, the server 140 may obtain passenger insurance premiums for default passenger insurance coverage (e.g., personal injury coverage, death and dismemberment coverage, and trip protection coverage for every passenger insurance policy).

In any event, the determined passenger insurance premiums may be displayed to the user via a passenger insurance selection screen of the passenger insurance application 282 on the mobile payment device 124. FIG. 4F illustrates a passenger insurance selection screen 492 which may include one or more user controls 494, 496, and 498 for selecting a passenger insurance premium and/or for declining the offer to purchase passenger insurance for the vehicle trip. In the exemplary passenger insurance selection screen 492, the user may select to purchase passenger insurance from JD's Auto Insurance for the vehicle trip at a cost of "$0.15 a minute" by touch-selecting the "$0.15 a minute" indication 494. Alternatively, the user may select to purchase passenger insurance from Insurance X for the vehicle trip at a cost of "$0.17 a minute" by touch-selecting the "$0.17 a minute" indication 496, or may decline passenger insurance for the vehicle trip by touch-selecting the "No, thanks" indication 498. In other embodiments, the user may select one of the passenger insurance premiums displayed on the passenger insurance selection screen 492 via any other suitable user control.

In some embodiments, the server 140 may categorize the passenger insurance premiums and their respective insurance providers based on vehicle usage unit and rank the passenger insurance premiums according to cost for a particular vehicle usage unit. For example, JD's Auto Insurance may be ranked ahead of Insurance X for passenger insurance premiums based on duration, because JD's Auto Insurance offers a passenger insurance premium of $0.15 a minute, whereas Insurance X offers a passenger insurance premium of $0.17 a minute. The passenger insurance premiums and their respective insurance providers may then be displayed on the passenger insurance selection screen 492 in order of their respective ranking. For example, the highest ranking passenger insurance premium may be displayed at the top of the passenger insurance selection screen 492, while the lowest ranking passenger insurance premium may be displayed at the bottom of the passenger insurance selection screen 492.

Also, in some embodiments, the server 140 may obtain a predetermined threshold number of passenger insurance premiums and their respective insurance providers to display on the passenger insurance selection screen 492. The passenger insurance premiums which may be ranked at or above the predetermined threshold number may be displayed on the passenger insurance selection screen 492. For example, if the predetermined threshold number is seven passenger insurance premiums, the seven highest ranking passenger insurance premiums and their respective insurance providers may be displayed on the passenger insurance selection screen 492.

In other embodiments, the passenger insurance premiums and their respective insurance providers may be ranked and displayed in any other suitable manner such as alphabetically, based on a customer satisfaction rating for each insurance provider, based on the location of the nearest agent for each insurance provider, etc.

While the passenger insurance selection screen 492 includes two insurance premiums, this is merely for ease of illustration only. The passenger insurance selection screen 492 may include any suitable number of insurance premiums. Moreover, while the passenger insurance selection screen 492 includes insurance premiums based on one type of vehicle usage unit (duration), the passenger insurance application 282 may include passenger insurance selection screens (not shown) for several types of vehicle usage units and for several types of insurance coverage.

For example, the passenger insurance application 282 may include a passenger insurance selection screen which includes insurance premiums based on the duration of the vehicle trip; a passenger insurance selection screen which includes flat rate insurance premiums for the entire vehicle trip regardless of distance and duration; a passenger insurance selection screen which includes insurance premiums corresponding to insurance policies which provide personal injury coverage; a passenger insurance selection screen which includes insurance premiums corresponding to insurance policies which provide death and dismemberment coverage; a passenger insurance selection screen which includes insurance premiums corresponding to insurance policies which provide trip protection coverage; or a passenger insurance selection screen which includes insurance premiums based on any suitable combination of distance, duration, and/or types of insurance coverage (e.g., an insurance premium based on the distance of the vehicle trip and corresponding to an insurance policy which provides trip protection coverage and personal injury coverage).

When the user selects one of the insurance premiums, for example, by touch-selecting the "$0.15 a minute" indication 496, the passenger insurance application 282 may instruct the user to swipe a credit/debit card through the magnetic stripe reader 298 which may include a magnetic read head that may read the payment information stored on the credit/debit card. The received payment information may be used to complete the purchase of the insurance policy corresponding to the selected insurance premium. Alternatively, a computer chip reader may read the payment information stored in integrated circuits on the credit/debit card. In some embodiments, the mobile payment device 124 may display the order review screen 460 depicted in FIG. 4D.

In any event, the server 140 may transmit the amount charged to the insurance provider server 166 for the selected insurance provider. The insurance provider server 166 may generate and transmit an insurance policy corresponding to the selected premium and/or a confirmation that the passenger has passenger insurance coverage for the vehicle trip, and may transmit the insurance policy and/or the confirmation to the server 140. The purchased insurance policy and/or the confirmation may be displayed on the mobile payment device 124, and/or may be transmitted to a user device, for example via the user's email address. In some embodiments, the user may be required to electronically sign the passenger insurance policy and/or the confirmation thereby making the agreement for passenger insurance coverage for the vehicle trip binding. Also, in some embodiments, when the server 140 transmits the confirmation to the mobile payment device 124, the confirmation may include a link to current policies "on file" for the insurance provider, so that the user may view a similar passenger insurance policy while the insurance provider server 166 generates the passenger insurance policy for the user.

Moreover, when the vehicle 108 reaches the destination, the mobile payment device 124 may instruct the on-board computer to transmit vehicle trip information to the server 140, and the mobile payment device 124 may transmit the payment information to the server 140. The server 140 may determine the total payment amount based on the vehicle trip information and the selected insurance premium, and the server 140 and/or the mobile payment device 124 may charge the total payment amount to the credit/debit card. In some embodiments, the mobile payment device 124 may display the passenger insurance receipt screen 476 depicted in FIG. 4E.

Moreover, in some embodiments, the mobile payment device 124 may also determine the cost of the vehicle trip (e.g., the cab fare), and offer the user the option to pay for both the cost of the vehicle trip and the passenger insurance in one payment. If the user accepts the offer, the cost of the vehicle trip may be added to the cost of the passenger insurance and charged to the credit/debit card. In some embodiments, the transportation service provider may receive the entire payment, may receive the cost of the vehicle trip, and/or may receive any combination of the cost of the vehicle trip and the cost of the passenger insurance. Likewise, the insurance provider server 166 for the selected insurance provider may receive the entire payment, may receive the cost of the passenger insurance, and/or may receive any combination of the cost of the vehicle trip and the cost of the passenger insurance. For example, the transportation service provider may receive a percentage of the passenger insurance for placing the mobile payment device 124 in the vehicle 108.

In an exemplary scenario, passenger John Doe arranges for an autonomous vehicle from a taxi service to pick him up at his home and drop him off at a movie theatre a few miles away. Mr. Doe has never traveled in an autonomous vehicle and is concerned with his safety during the trip. Moreover, John Doe is also transporting a very expensive birthday present which he plans to give to his wife at the movie theatre. To ease his concerns, John may purchase an insurance policy by selecting from several different insurance providers, protecting him against personal injury as well as against damage to the birthday present through his smart phone or by using the mobile payment device within the autonomous vehicle. In this manner, John Doe may purchase passenger insurance for an autonomous vehicle in a fast, efficient manner, just as he begins his trip. Moreover, Mr. Doe may be provided with peace of mind while travelling in an autonomous vehicle for the first time and may feel more comfortable about future autonomous vehicle trips.

Figure 5:
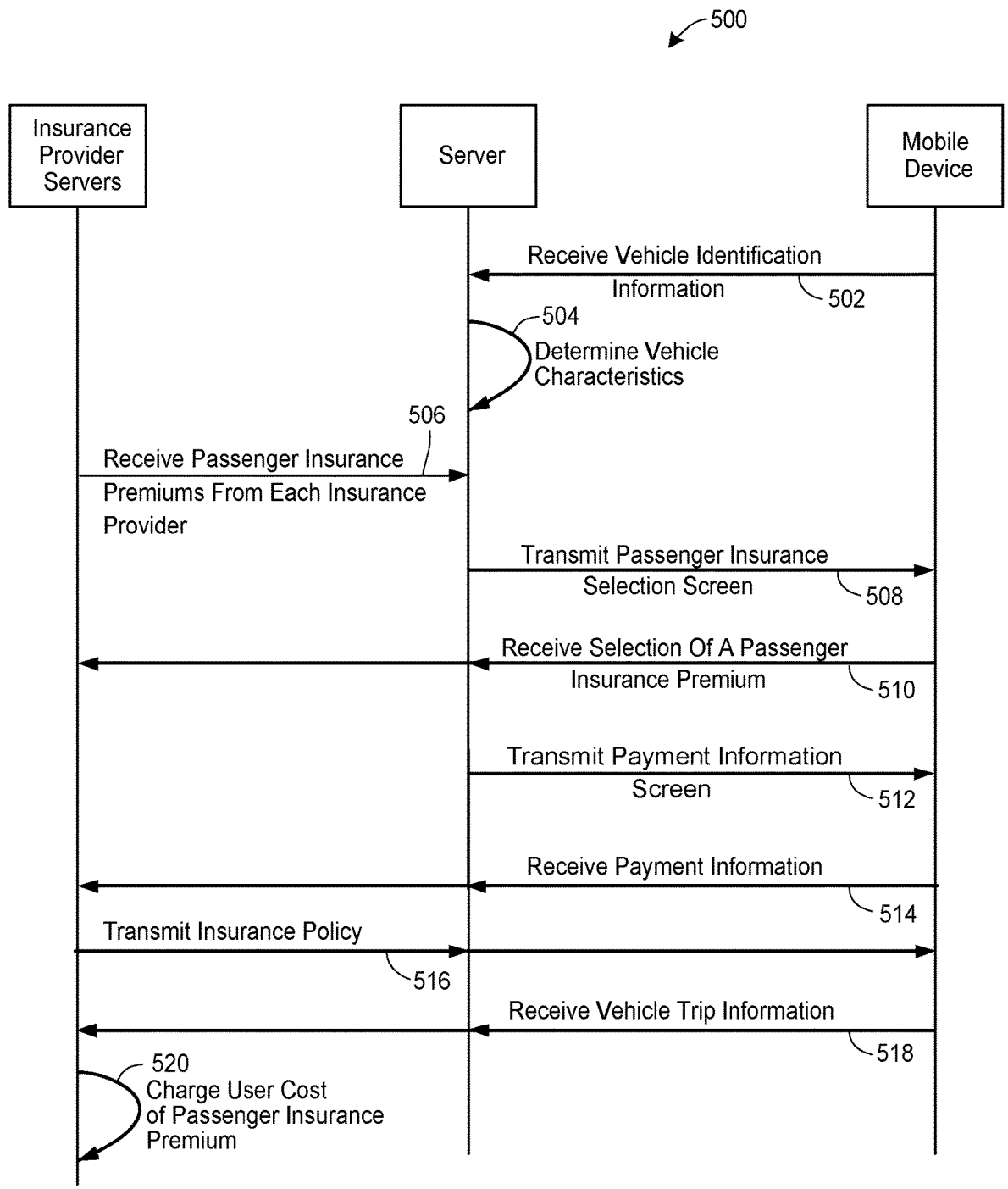
FIG. 5 illustrates an exemplary interaction between the insurance provider servers, the computer server, and the mobile device when a customer receives an offer for trip-based passenger insurance in accordance with the presently described embodiments.

FIG. 5 illustrates an example interaction 500 between the insurance provider servers 166, the server 140, and the mobile device 110 when a customer receives an offer for trip-based passenger insurance. When the user wants to purchase trip-based passenger insurance for a vehicle trip in an autonomous vehicle, the user may enter vehicle identification information for the autonomous vehicle at the user's mobile device 110 (e.g., using the vehicle identification screen 400 of the client application 236 as shown in FIG. 4A). The vehicle identification information may be transmitted to the server 502, and the server may determine corresponding characteristics for the vehicle based on the vehicle identification information 504. The server may then search public information such as the Internet for indications of insurance premiums offered by insurance providers associated with the set of determined vehicle characteristics corresponding to the autonomous vehicle. The server may also establish communication links with several insurance provider servers, and the insurance provider servers may transmit passenger insurance premiums associated with the set of determined vehicle characteristics to the server 506.

In some scenarios, for example when the user pre-purchases passenger insurance for a vehicle trip via the user's laptop or desktop computer when booking the vehicle trip with a transportation service provider (e.g., a driverless taxi service), the user may not be prompted to enter vehicle identification information. Instead, passenger insurance premiums offered by insurance providers may be obtained based on non-vehicular factors.

Using the received passenger insurance premiums, the server may generate and transmit a passenger insurance selection screen 508 of the client application 236 (e.g., the passenger insurance selection screen 420 as shown in FIG. 4B), which may include each of the passenger insurance premiums and indications of their respective insurance providers. The user may select one of the passenger insurance premiums via user controls on the passenger insurance selection screen, and the received selection may be transmitted to the server 510.

In some embodiments, the selected user control may include a direct link to a web page of the insurance provider for purchasing the selected passenger insurance premium. The server may then transmit the selected passenger insurance premium to the corresponding insurance provider server, which may transmit web pages for completing the purchase of the passenger insurance to the server or directly to the mobile device. The insurance provider server may also receive payment information 514 and/or vehicle trip information 518 from the server or directly from the mobile device.

The server and the client application 236 may complete the purchase of the passenger insurance policy, and the server may communicate with the corresponding insurance provider to transmit the received payment and to receive the passenger insurance policy and/or a confirmation that the passenger has passenger insurance coverage for the vehicle trip. In such an embodiment, the insurance provider may agree ahead of time to allow the server to complete the purchase of passenger insurance on behalf of the insurance provider.

In this scenario, when a selected passenger insurance premium and an indication of a corresponding insurance provider is received at the server 140, the server may transmit a payment information screen 512 (e.g., the payment information screen 440 as shown in FIG. 4C), which may request payment information from the user such as a credit/debit card number, or an electronic bank account number and routing number. When the server receives the payment information from the mobile device 514, the server may transmit a request to the corresponding insurance provider server to transmit an insurance policy for the selected insurance premium and/or a confirmation that the passenger has passenger insurance coverage for the vehicle trip. The corresponding insurance provider server may transmit the insurance policy and/or the confirmation to the server 516, which may be forwarded to the mobile device. In some embodiments, the user may be required to electronically sign the passenger insurance policy and/or the confirmation thereby making the agreement for passenger insurance coverage for the vehicle trip binding. Also, in some embodiments, when the server transmits the confirmation to the mobile device, the confirmation may include a link to current policies "on file" for the insurance provider, so that the user may view a similar passenger insurance policy while the insurance provider server generates the passenger insurance policy for the user.

Upon completion of the vehicle trip, the mobile device or an on-board computer in the autonomous vehicle may transmit vehicle trip information 518 such as the distance and estimated duration of the vehicle trip to the server. The server may then charge the user for passenger insurance based on the selected passenger insurance premium and the vehicle trip information using the received payment information. The charged amount may be transmitted to the corresponding insurance provider 520, completing the transaction for the passenger insurance policy.

Figure 6:
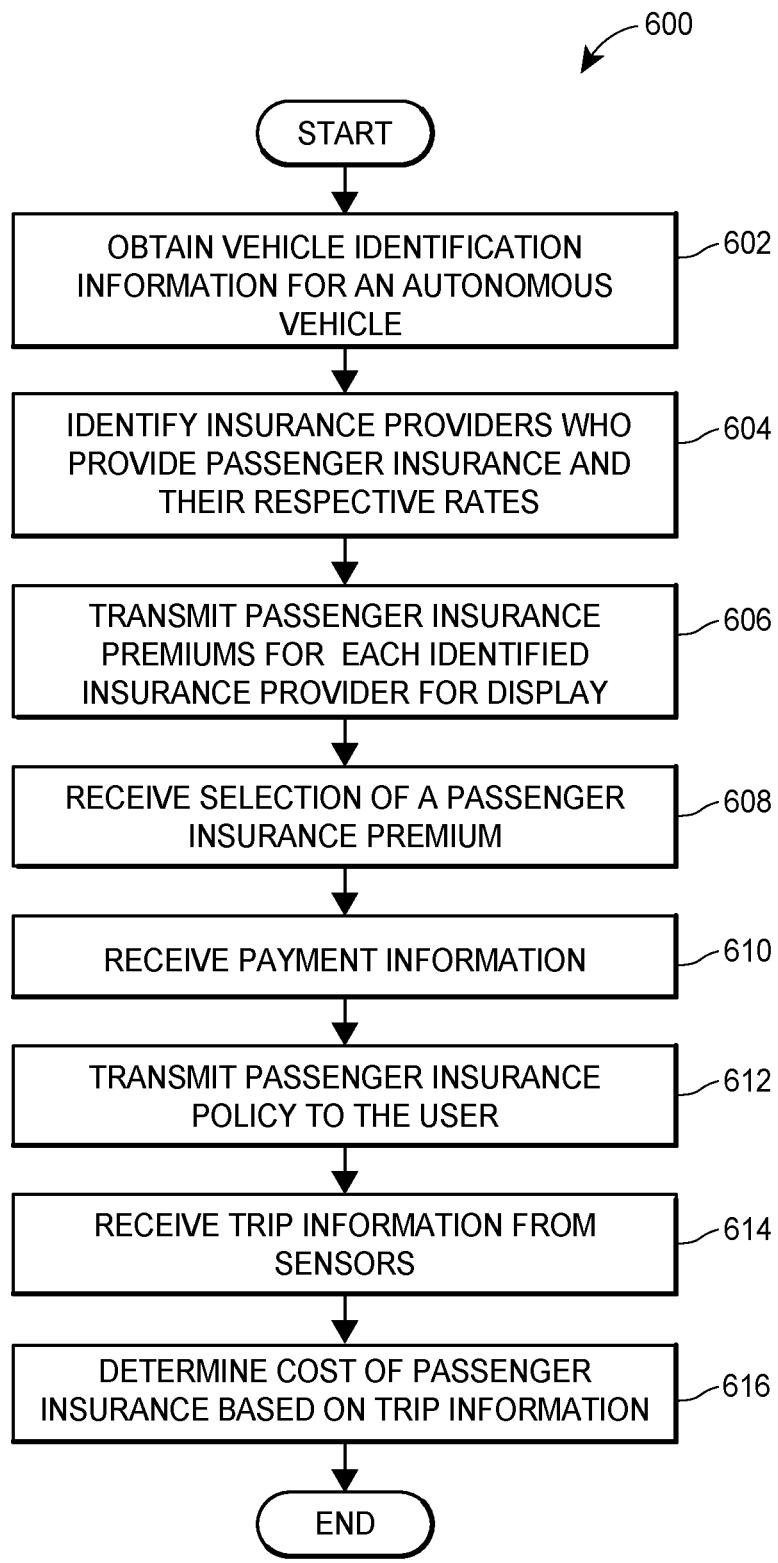
FIG. 6 illustrates a flow diagram representing an exemplary method for providing customers with rates from multiple insurance providers for purchasing passenger insurance for vehicle trips in autonomous vehicles in accordance with the presently described embodiments.

FIG. 6 illustrates a flow diagram representing an exemplary method 600 for providing customers with rates from multiple insurance providers for purchasing passenger insurance. The method 600 may be executed on the mobile device 110, the on-board computer 114, the server 140, the mobile payment device 124, the insurance provider server 166, or some combination of the mobile device 110, the on-board computer 114, the server 140, the mobile payment device 124, and the insurance provider server 166. In some embodiments, the method 600 may be implemented in a set of instructions stored on a non-transitory computer-readable memory and executable on one or more processors of the server 140.

At block 602, vehicle identification information for an autonomous vehicle may be obtained. Vehicle identification information may include any suitable information which may identify the vehicle such as, for example, the make, model, and year of the vehicle, the owner of the vehicle, etc. In some embodiments, the server 140 may obtain a VIN number, a license plate number, a barcode which contains vehicle identification information, etc.

In any event, the server 140 may determine corresponding characteristics for the vehicle based on the vehicle identification information, such as autonomous operation features within the vehicle, the age of the vehicle, components within the vehicle such as autonomous operation features within the vehicle, a type and version of each of the autonomous operation features, an operation of each of the autonomous operation features, a type and version of autonomous operation feature control software, settings of the autonomous operation features, the age of the vehicle, components within the vehicle such as the type of transmission, the engine type, etc. The corresponding characteristics for the vehicle may be compared to characteristics of other autonomous vehicles to identify autonomous vehicles having similar vehicle characteristics. When a match is identified, the server 140 may retrieve previously obtained passenger insurance premiums and indications of their corresponding insurance providers for the matching set of stored vehicle characteristics (block 604). Additionally or alternatively, when a match is not identified and for additional or updated passenger insurance premiums, the server 140 may search public information (e.g., the Internet) for indications of passenger insurance premiums offered by insurance providers. Moreover, in some embodiments, the server 140 may communicate via the network 130 with the insurance provider servers 166 to obtain indications of passenger insurance premiums.

In any event, the identified passenger insurance premiums and indications of their respective insurance providers may be transmitted to the user via a passenger insurance selection screen of the client application 236 on the mobile device 110, and/or a passenger insurance selection screen of the passenger insurance application 282 on the mobile payment device 124 (block 606). In some embodiments, the passenger insurance premiums and their respective insurance providers may be categorized based on vehicle usage unit and ranked according to cost for a particular vehicle usage unit. The passenger insurance premiums and their respective insurance providers may then be displayed in order of their respective ranking. Also, in some embodiments, the server 140 may obtain a predetermined threshold number of passenger insurance premiums and their respective insurance providers to display.

The user may then select one of the passenger insurance premiums and the corresponding insurance provider by for example, touch-selecting and/or double clicking on one of the user controls corresponding to a passenger insurance premium (block 608). Once a selection has been made, payment information for an insurance policy corresponding to the selected insurance premium may be received (block 610). For example, the user may enter credit/debit card information such as a first name, last name, credit card number, credit card expiration date, and credit card security code. In other embodiments, the user may swipe her credit/debit card using the mobile payment device 124.

If the selected insurance premium is a flat rate insurance premium for the entire vehicle trip regardless of distance and/or duration, the selected credit card number may be charged the amount of the flat rate insurance premium. The server 140 may then forward the charged amount to the insurance provider server 166 for the selected insurance provider. If the selected insurance premium depends on the duration and/or distance of the vehicle trip, then the total payment amount may not be charged until the vehicle trip is completed. However, in some embodiments, the mobile device 110, the on-board computer 114 and/or the server 140 may determine a planned distance for the vehicle trip. For example, if the user requests a vehicle trip from her apartment to her place of business and the selected insurance premium depends on the distance of the vehicle, then the distance from the user's apartment to her place of business may be determined as a planned distance, and the server 140 may determine the total payment amount based on the planned distance and may charge the selected credit card number.

At block 612, the passenger insurance policy may be transmitted to the user. For example, when the user selects the passenger insurance premium and corresponding insurance provider, the server 140 may transmit a request to the insurance provider server 166 for the selected insurance provider to generate and transmit an insurance policy corresponding to the selected insurance premium and/or a confirmation that the passenger has passenger insurance coverage for the vehicle trip. Accordingly, the insurance provider server 166 may transmit the insurance policy and/or the confirmation to the server 140, which may in turn, transmit the insurance policy and/or the confirmation to be displayed at the client application 236 on the mobile device 110 or the passenger insurance application 292 on the mobile payment device 124 and may transmit the insurance policy and/or the confirmation to the user's email address. In some embodiments, the user may be required to electronically sign the passenger insurance policy and/or the confirmation thereby making the agreement for passenger insurance coverage for the vehicle trip binding. Also, in some embodiments, when the server 140 transmits the confirmation to the mobile device 110, the confirmation may include a link to current policies "on file" for the insurance provider, so that the user may view a similar passenger insurance policy while the server generates the passenger insurance policy for the user.

To determine the total payment amount, the server 140 may receive vehicle trip information detected by sensors in the mobile device 110, and/or the on-board computer 114 (block 614). For example, when the vehicle 108 picks up the user, the mobile device 110 and/or the on-board computer 114 may determine a departure time and/or a departure location for the vehicle trip. When the vehicle 108 arrives at the destination, the mobile device 110 and/or the on-board computer 114 may determine a destination time, a destination location, a total distance traveled during the vehicle trip, an estimated duration of the vehicle trip, etc. The vehicle trip information may be determined based on sensor data generated by the sensors 120 in the vehicle 108 or the mobile device 110. Methods for determining the vehicle trip information are described in more detail below in FIG. 6.

At block 616, the total payment amount may be determined based on the selected passenger insurance premium and the vehicle trip information. For example, if the selected passenger insurance premium is $2.00 a mile, and the vehicle traveled 11 miles during the vehicle trip, the total payment amount may be $22.00. The server 140 may then forward the charged amount to the insurance provider server 166 for the selected insurance provider.

Figure 7:
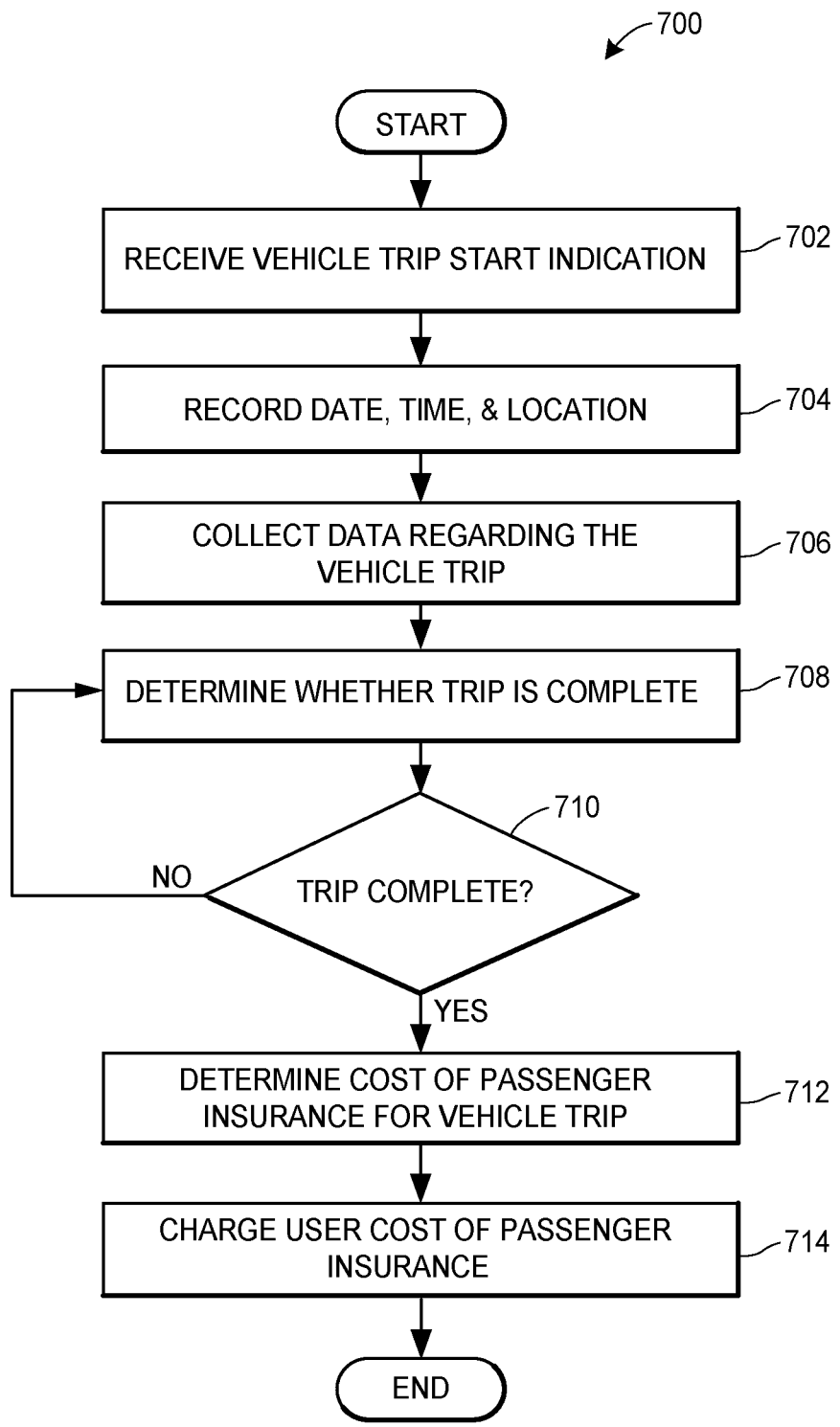
FIG. 7 illustrates a flow diagram representing an exemplary method for collecting vehicle trip information to determine the cost of passenger insurance for vehicle trips in autonomous vehicles in accordance with the presently described embodiments.

FIG. 7 illustrates a flow diagram representing an exemplary method 700 for collecting vehicle trip information to determine the cost of passenger insurance for vehicle trips in autonomous vehicles. The method 700 may be executed on the mobile device 110, the on-board computer 114, the server 140, the mobile payment device 124, the insurance provider servers 166 or some combination of the mobile device 110, the on-board computer 114, the server 140, the mobile payment device 124, and the insurance provider servers 166. In some embodiments, the method 700 may be implemented in a set of instructions stored on a non-transitory computer-readable memory and executable on one or more processors of the mobile device 110. Moreover, in some embodiments, the method 700 may correspond to block 612 of the method 600, and may be a portion of the method 600.

At block 702, the mobile device 110 may receive an indication of the start of a vehicle trip, such as movement of the vehicle 108 from the departure location, placement of the mobile device 110 within proximity of the vehicle, entry of the passenger into the vehicle 108, etc. For example, the mobile device 110 may identify a communication connection (e.g., via Bluetooth pairing) with the vehicle 108 and receive an indication from its GPS unit 206 that the mobile device 110 has moved to a new location while remaining communicatively connected to the vehicle 108. In alternative embodiments, the vehicle 108 may be continuously monitored, in which case the occurrence of a vehicle trip may be indicated at either the start or end of the vehicle trip.

Upon receiving an indication of the start of the vehicle trip, the mobile device 110 may record a time stamp associated with the start of the vehicle trip (block 704). The time stamp may include the date, time of day, location, or other information related to the vehicle trip. The time stamp may be further associated with additional information during or upon completion of the vehicle trip, including the following: distance traveled, estimated duration of the vehicle trip, estimated duration of vehicle operation during the vehicle trip, destination location of the vehicle trip, or time, duration, and location of stops.

The mobile device 110 may then proceed to collect data regarding the vehicle trip (block 706). The data may include data regarding vehicle location, stops, speed, acceleration, or other information regarding vehicle operation. Data may be collected from a variety of sensors within or communicatively connected to the mobile device 110 or the on-board computer 114. The sensors may include any device capable of providing sensor data regarding the vehicle location, vehicle operation, vehicle motion, or the vehicle's environment. The sensors may include the GPS unit 206, an accelerometer unit (not shown), an image capture unit (not shown), a distance sensor (not shown), a tachometer (not shown), a speedometer (not shown), or other vehicle sensors 120 within the vehicle 108. The data may be collected and stored on the mobile device 110 or may be communicated to the server 140 via the network 130.

At block 708, the mobile device 110 may determine whether the vehicle trip is complete. The vehicle trip may be determined to be complete for example, upon the arrival of the vehicle 108 at the destination location, when the engine of the vehicle 108 is shut off, when the passenger exits the vehicle 108, etc. Additionally, or alternatively, the passenger may provide an indication of the completion of the vehicle trip using the mobile device 110, or the on-board computer 114. When the trip is not complete, the mobile device 110 proceeds to collect data regarding the use of the vehicle at block 706.

When the trip is complete, the mobile device 110 may communicate the information regarding the vehicle trip to the server 140, which may determine the cost of passenger insurance for the vehicle trip (block 712). Alternatively, the mobile device 110 may determine the cost of passenger insurance for the vehicle trip and communicate the cost of passenger insurance for the vehicle trip to the server 140. As described above, the cost of passenger insurance for the vehicle trip may be determined based upon the selected passenger insurance premium and the distance (or a planned distance), duration, departure location, or destination location of the vehicle trip. Once the cost of passenger insurance for the vehicle trip has been determined, the server 140 may charge the user the cost of the passenger insurance policy (block 714), for example, using the user's entered payment information in block 610 of the method 600. The server 140 may then forward the charged amount to the insurance provider server 166 for the selected insurance provider.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

We claim:

1. A computer-implemented method for providing customers with rates from insurance providers for trip-based passenger insurance in an autonomous vehicle having one or more autonomous operation features for driving the autonomous vehicle, the method executed by one or more processors programmed to perform the method, the method comprising:

receiving, at one or more processors from a mobile device of a user, vehicle identification information for an autonomous vehicle having one or more autonomous operation features for driving the autonomous vehicle, wherein the autonomous vehicle provides transportation services for the user on a vehicle trip, including receiving an image of at least a portion of the autonomous vehicle captured by a camera included in the mobile device;

determining, by the one or more processors, one or more characteristics of the autonomous vehicle based on the vehicle identification information, the one or more characteristics including at least one of: a type and version of the autonomous operation feature, an operation of the autonomous operation feature, a type and version of autonomous operation feature control software, or settings of the autonomous operation feature;

identifying, by the one or more processors, a plurality of insurance providers that provide trip-based passenger insurance in autonomous vehicles having one or more autonomous operation features for driving the autonomous vehicles;

for each of the identified plurality of insurance providers:
   determining, by the one or more processors, one or more passenger insurance premiums for insuring the user during the vehicle trip based on the one or more characteristics of the autonomous vehicle, wherein each of the one or more passenger insurance premiums includes a cost per vehicle usage unit;
   causing, by the one or more processors, indications of each of the identified plurality of insurance providers and the corresponding one or more passenger insurance premiums to be displayed to the user; and
   causing, by the one or more processors, a plurality of user controls to be displayed to the user corresponding to each of the identified plurality of insurance providers, wherein each user control directs the user to a page for purchasing a selected passenger insurance premium from the corresponding insurance provider;

receiving, at the one or more processors, a selection by the user of at least one of the one or more passenger insurance premiums;

receiving, at the one or more processors, payment information for a cost associated with passenger insurance from the vehicle trip including:
   receiving, at the one or more processors, sensor data from one or more sensors in the autonomous vehicle or the mobile device of the user;
   determining, by the one or more processors, vehicle trip information based on the sensor data; and
   determining, by the one or more processors, the cost associated with passenger insurance for the vehicle trip based on the vehicle trip information and the selected at least one passenger insurance premium; and in response to receiving the payment information, transmitting, by the one or more processors, a passenger insurance policy to the user based on the selected at least one passenger insurance premium.

2. The method of claim 1, wherein each identified insurance provider charges a passenger insurance premium for each type of vehicle usage unit and further comprising:

for each type of vehicle usage unit, ranking, by the one or more processors, the identified plurality of insurance providers based upon a cost of the corresponding passenger insurance premium for the respective insurance provider; and causing, by the one or more processors, a predetermined threshold number of indications of insurance providers to be displayed to the user, wherein indications of the insurance providers ranked at or above the predetermined threshold number are displayed to the user.

3. The method of claim 2, wherein the type of vehicle usage unit includes at least one of: a cost per mile during the vehicle trip, a cost per minute during the vehicle trip, or a predetermined flat rate cost for the vehicle trip.

4. The method of claim 1, further comprising storing, by the one or more processors, the indications of each of the identified plurality of insurance providers and the corresponding one or more passenger insurance premiums with the one or more characteristics of the autonomous vehicle.

5. The method of claim 4, wherein the one or more characteristics are one or more first characteristics and wherein determining one or more passenger insurance premiums for insuring the user based on the one or more first characteristics of the autonomous vehicle comprises:
    comparing, by the one or more processors, the one or more first characteristics to one or more second characteristics for other autonomous vehicles, each having one or more autonomous operation features for driving the other autonomous vehicles, and for which passenger insurance premiums have been determined; and
    when there is a match between the one or more first characteristics and a set of the one or more second characteristics, determining, by the one or more processors, the one or more passenger insurance premiums and the indications of the corresponding insurance providers for insuring the user based on the stored passenger insurance premiums associated with the matching set of one or more second characteristics for the other autonomous vehicles.

6. The method of claim 5, wherein comparing the one or more first characteristics to one or more second characteristics for other autonomous vehicles includes comparing, by the one or more processors, information regarding one or more autonomous operation features of the autonomous vehicle to information regarding one or more autonomous operation features of the other autonomous vehicles.

7. A system for providing customers with rates from insurance providers for trip-based passenger insurance in an autonomous vehicle having one or more autonomous operation features for driving the autonomous vehicle, the system comprising:
    a communication network;
    one or more processors communicatively coupled to the communication network; and
    a non-transitory computer-readable memory coupled to the one or more processors and storing thereon instructions that, when executed by the one or more processors, cause the system to:
        receive, via the communication network from a mobile device of a user, vehicle identification information for an autonomous vehicle having one or more autonomous operation features for driving the autonomous vehicle, wherein the vehicle provides transportation services for the user on a vehicle trip, including receive an image of at least a portion of the autonomous vehicle captured by a camera included in the mobile device,
        determine one or more characteristics of the autonomous vehicle based on the vehicle identification information, the one or more characteristics including at least one of: a type and version of the autonomous operation feature, an operation of the autonomous operation feature, a type and version of autonomous operation feature control software, or settings of the autonomous operation feature,
        identify a plurality of insurance providers that provide trip-based passenger insurance in autonomous vehicles having one or more autonomous operation features for driving the autonomous vehicles,
        for each of the identified plurality of insurance providers:
            determine one or more passenger insurance premiums for insuring the user during the vehicle trip based on the one or more characteristics of the autonomous vehicle, wherein each of the one or more passenger insurance premiums includes a cost per vehicle usage unit,
            cause indications of each of the identified plurality of insurance providers and the corresponding one or more passenger insurance premiums to be displayed to the user, and
            cause a plurality of user controls to be displayed to the user corresponding to each of the identified plurality of insurance providers, wherein each user control directs the user to a page for purchasing a selected passenger insurance premium from the corresponding insurance provider,
        receive a selection by the user of at least one of the one or more passenger insurance premiums;
        receive payment information for a cost associated with passenger insurance from the vehicle trip including:
            receive sensor data from one or more sensors in the autonomous vehicle or the mobile device of the user;
            determine vehicle trip information based on the sensor data; and
            determine the cost associated with passenger insurance for the vehicle trip based on the vehicle trip information and the selected at least one passenger insurance premium; and
        in response to receiving the payment information, transmit a passenger insurance policy to the user based on the selected at least one passenger insurance premium.

8. The system of claim 7, wherein each identified insurance provider charges a passenger insurance premium for each type of vehicle usage unit and the instructions further cause the system to:
    for each type of vehicle usage unit, rank the identified plurality of insurance providers based upon a cost of the corresponding passenger insurance premium for the respective insurance provider, and
    cause a predetermined threshold number of indications of insurance providers to be displayed to the user, wherein indications of the insurance providers ranked at or above the predetermined threshold number are displayed to the user.

9. The system of claim 8, wherein the type of vehicle usage unit includes at least one of: a cost per mile during the vehicle trip, a cost per minute during the vehicle trip, or a predetermined flat rate cost for the vehicle trip.

10. The system of claim 7, wherein the instructions further cause the system to store the indications of each of the identified plurality of insurance providers and the corresponding one or more passenger insurance premiums with the one or more characteristics of the autonomous vehicle.

11. The system of claim 10, wherein the one or more characteristics are one or more first characteristics and wherein to determine one or more passenger insurance premiums for insuring the user based on the one or more first characteristics of the autonomous vehicle, the instructions cause the system to:
    compare the one or more first characteristics to one or more second characteristics for other autonomous vehicles, each having one or more autonomous operation features for driving the other autonomous vehicles, and for which passenger insurance premiums have been determined, and when there is a match between the one or more first characteristics and a set of the one or more second characteristics, determine the one or more passenger insurance premiums for insuring the user based on the stored passenger insurance premiums associated with the matching set of one or more second characteristics for the other autonomous vehicles.

12. The system of claim 11, wherein to compare the one or more first characteristics to one or more second characteristics for other autonomous vehicles, the instructions cause the system to compare information regarding one or more autonomous operation features of the autonomous vehicle to information regarding one or more autonomous operation features of the other autonomous vehicles.

13. A mobile payment device removably attached to an autonomous vehicle having one or more autonomous operation features for driving the autonomous vehicle, the mobile payment device comprising:

a user interface;
a communication network;
one or more processors communicatively coupled to the communication network and the user interface; and
a non-transitory computer-readable memory coupled to the one or more processors and storing thereon instructions that, when executed by the one or more processors, cause the mobile payment device to:
obtain vehicle identification information for an autonomous vehicle having the mobile payment device removably attached, wherein the vehicle includes one or more autonomous operation features for driving the autonomous vehicle and the autonomous vehicle provides transportation services for a user on a vehicle trip,
transmit, via the communication network, the obtained vehicle identification information to a server computing device,
receive, via the communication network from the server computing device, the one or more passenger insurance premiums for insuring the user during the vehicle trip, wherein the server device determines the one or more passenger insurance premiums by:
determining one or more characteristics of the autonomous vehicle based on the vehicle identification information, the one or more characteristics including at least one of: a type and version of the autonomous operation feature, an operation of the autonomous operation feature, a type and version of autonomous operation feature control software, or settings of the autonomous operation feature, and
determining the one or more passenger insurance premiums based on the one or more characteristics of the autonomous vehicle,
display, on the user interface, for each of a plurality of insurance providers, indications of each insurance provider and one or more corresponding passenger insurance premiums for insuring the user during the vehicle trip, wherein each of the one or more passenger insurance premiums includes a cost per vehicle usage unit,
display, on the user interface, a plurality of user controls corresponding to each of the plurality of insurance providers, wherein each user control directs the user to a page for purchasing a selected passenger insurance premium from the corresponding insurance provider,
receive, via one or more user controls on the user interface, a selection by the user of at least one of the one or more passenger insurance premiums,
obtain payment information for a cost associated with passenger insurance from the vehicle trip including:
receive sensor data from one or more sensors in the autonomous vehicle or a mobile device of the user;
determine vehicle trip information based on the sensor data; and
determine the cost associated with passenger insurance for the vehicle trip based on the vehicle trip information and the selected at least one passenger insurance premium, and
in response to obtaining the payment information, display, on the user interface, an insurance policy for the user based on the selected at least one passenger insurance premium.

14. The mobile payment device of claim 13, further comprising a magnetic stripe reader communicatively coupled to the one or more processors, wherein the payment information is obtained via the magnetic stripe reader.

15. The mobile payment device of claim 13, wherein the cost associated with passenger insurance for the vehicle trip is a first cost and wherein the instruction further cause the mobile payment device to:
determine a second cost associated with the vehicle trip based on the vehicle trip information; and
charge the user an amount based on an aggregate cost corresponding to the first cost associated with passenger insurance for the vehicle trip and the second cost associated with the vehicle trip.

* * * * *